United States Patent [19]
Yamasaki et al.

[11] Patent Number: 5,725,984
[45] Date of Patent: Mar. 10, 1998

[54] OMEGA-OXO-ALUMINUM PHTHALOCYANINE DIMER HAVING NOVEL POLYMORPH AND ELECTROPHOTOGRAPHIC PHOTORECEPTOR PREPARED BY USING THE SAME

[75] Inventors: Yasuhiro Yamasaki; Kazuyoshi Kuroda, both of Neyagawa, Japan

[73] Assignee: Orient Chemical Industries, Ltd., Osaka-fu, Japan

[21] Appl. No.: 799,419

[22] Filed: Feb. 12, 1997

[30] Foreign Application Priority Data

Feb. 13, 1996 [JP] Japan ................ 8-025206

[51] Int. Cl.$^6$ ............ G03G 5/06; C09B 47/04; C09B 67/50
[52] U.S. Cl. ............ 430/58; 430/78; 540/140; 540/141
[58] Field of Search .......... 430/58, 78; 540/140, 540/141

[56] References Cited

U.S. PATENT DOCUMENTS

| | | | |
|---|---|---|---|
| 4,578,330 | 3/1986 | Regan et al. | 430/78 |
| 4,732,832 | 3/1988 | Nogami et al. | 430/78 |
| 5,039,798 | 8/1991 | Johnson | 430/78 |
| 5,456,998 | 10/1995 | Burt et al. | 430/58 |

FOREIGN PATENT DOCUMENTS 60-254044  12/1985  Japan ................ 430/78

*Primary Examiner*—Roland Martin
*Attorney, Agent, or Firm*—Birch, Stewart, Kolasch & Birch, LLP

[57] ABSTRACT

The present invention provides μ-oxo-aluminum phthalocyanine dimer having a novel polymorph. The μ-oxo-aluminum phthalocyanine dimer may be applied to as a charge generator for an organic photoconductive material, such as a high-gamma photoreceptor which is corresponding to a short-wavelength of light sauce (LED). The μ-oxo-aluminum phthalocyanine dimer having a novel polymorph which shows diffraction peaks at a Bragg angle (2θ±0.2°) of 6.9°, 9.7°, 13.8°, 15.4°, 23.9°, and 25.9° in a X-ray diffraction spectrum by CuK α-ray.

12 Claims, 17 Drawing Sheets

FIG. I

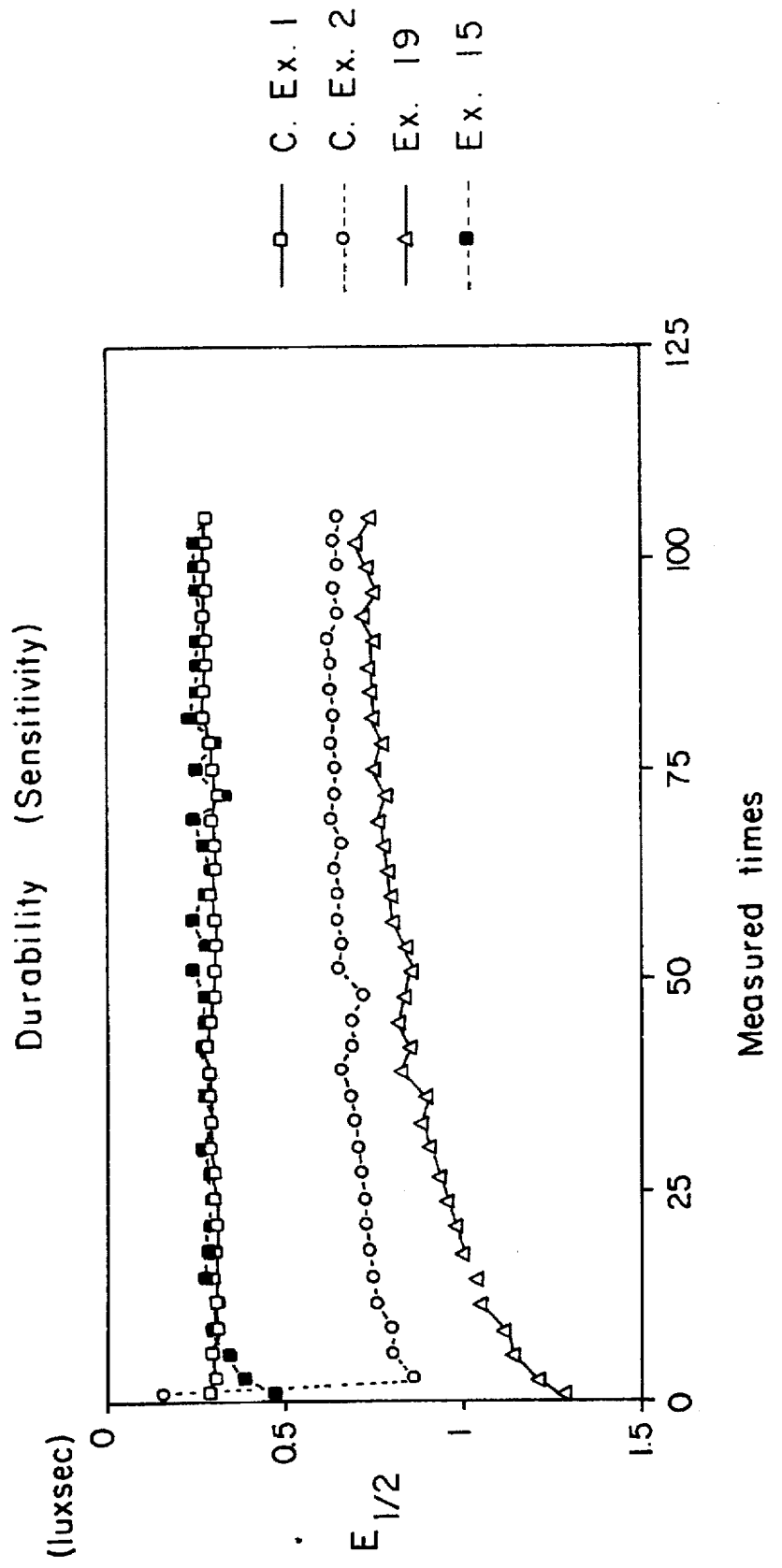

OMEGA-OXO-ALUMINUM PHTHALOCYANINE DIMER HAVING NOVEL POLYMORPH AND ELECTROPHOTOGRAPHIC PHOTORECEPTOR PREPARED BY USING THE SAME

FIELD OF THE INVENTION

The present invention relates to μ-oxo-aluminum phthalocyanine dimer having a novel polymorph and an electrophotographic photoreceptor prepared by using the same.

BACKGROUND OF THE INVENTION

An electrophotographic photoreceptor have been widely applied to an electrophotographic apparatus such as a copying machine, a printer and the like. An inorganic photoconductor having photosensitivity in a visible region, for example amorphous selenium, has been heretofore used as the electrophotographic photoreceptor.

However, the inorganic photoconductor has a disadvantage that it contains harmful selenium and cadmium sulfide, and costs for scrapping it become high. Further, the inorganic photoconductor is generally prepared by a vapor deposition method, and costs for producing it become high. The high production cost may also become a disadvantage when it is applied to a low-priced machine.

An organic photoconductive substance which is sensitive to semi-conductor laser ray (about 800 nm), has been a matter of interest in the art. A lot of organic photoconductive materials using such an organic photoconductive substance as an active component, have also been proposed. Examples thereof include a negative charging-form organic photoconductor (OPC) which contains a squarylium compound, an azulenium compound, and a phthalocyanine compound as a charge generator. This type of organic photoconductor (OPC) has a conductive substrate, and a photoconductive layer formed thereon which comprises a charge generator and a charge transporting material. It is generally classified as those of mono-layered construction and of bi-layered construction.

The organic photoconductor (OPC) however does not have sufficient electronic property such as chargeability, dark decay, and residual potential, and does not have sufficient durability, when it is charged and irradiated repeatedly in the practical use. Thus, it is desired an organic photoconductive compound which has high sensitivity to visible light or longer-wavelength light, and high durability, when it is used as a charge generator of a charge generating layer (CGL), particularly those of the function separated-form organic photoconductor (OPC) which has bi-layered (CGL and charge transporting layer (CTL)) construction.

Phthalocyanine (This is hereinafter referred to as "Pc".) shows wide variety of electronic properties depending on a kind of the central metal atom bonded thereto, and on a kind of preparing process or treating process. It is also known to the art that even if the chemical structure of Pc is constant, when stacking state of the molecules of Pc changes, electronic property thereof may vary widely.

The stacking state of an organic compound is determined by a polymorph of the compound. That is, the polymorph determines an electronic state, particularly a perturbation of π electron of the compound. Therefor, it is a factor for improving properties of an organic photoconductive material, as an electronic material.

Some Pcs such as titanyl Pc, vanadil Pc, and X-form nonmetallo-Pc are actually applied to an electrophotographic photoreceptor. However, photosensitivity and durability of such an organic photoconductor (OPC) is insufficient. There is therefore a need for a novel polymorph of Pc, which may provide an electrophotographic photoreceptor having good photosensitivity and good durability.

SUMMARY OF THE INVENTION

The present invention provides μ-oxo-aluminum phthalocyanine dimer having a novel polymorph. The μ-oxo-aluminum phthalocyanlne dimer may be applied to as a charge generator for an organic photoconductive material, such as a high-gamma photoreceptor which is corresponding to a short-wavelength of light sauce (LED).

The resulting organic photoconductive material has good stability and electronic property (for example, good chargeability, low dark decay, and low residual potential).

The present invention provides μ-oxo-aluminum phthalocyanine dimer having a novel polymorph which shows diffraction peaks at a Bragg angle (2θ±0.2°) of 6.9°, 9.7°, 13.8°, 15.4°, 23.9°, and 25.9° in a X-ray diffraction spectrum by CuK α-ray.

The μ-oxo-aluminum phthalocyanine dimer having the novel polymorph is referred to as "II-form dimer", and the novel polymorph is referred to as "II-form polymorph", hereinafter.

II-form dimer of the present invention is preferably prepared by the process comprising:

obtaining μ-oxo-aluminum phthalocyanine dimer having conventional polymorph (referred to as "I-form dimer", hereinafter);

dry milling the I-form dimer; and wet milling or simply dispersing the I-form dimer in an organic solvent.

The present invention also provides an electrophotographic photoreceptor prepared by using the II-form dimer.

BRIEF EXPLANATION OF DRAWINGS

FIG. 17 is a plot of results obtained by a sensitivity durability analysis of photoreceptors which is prepared in Examples 15 and 19, and Comparative Examples 1 and 2.

DETAILED DESCRIPTION OF THE INVENTION

Figure 1:
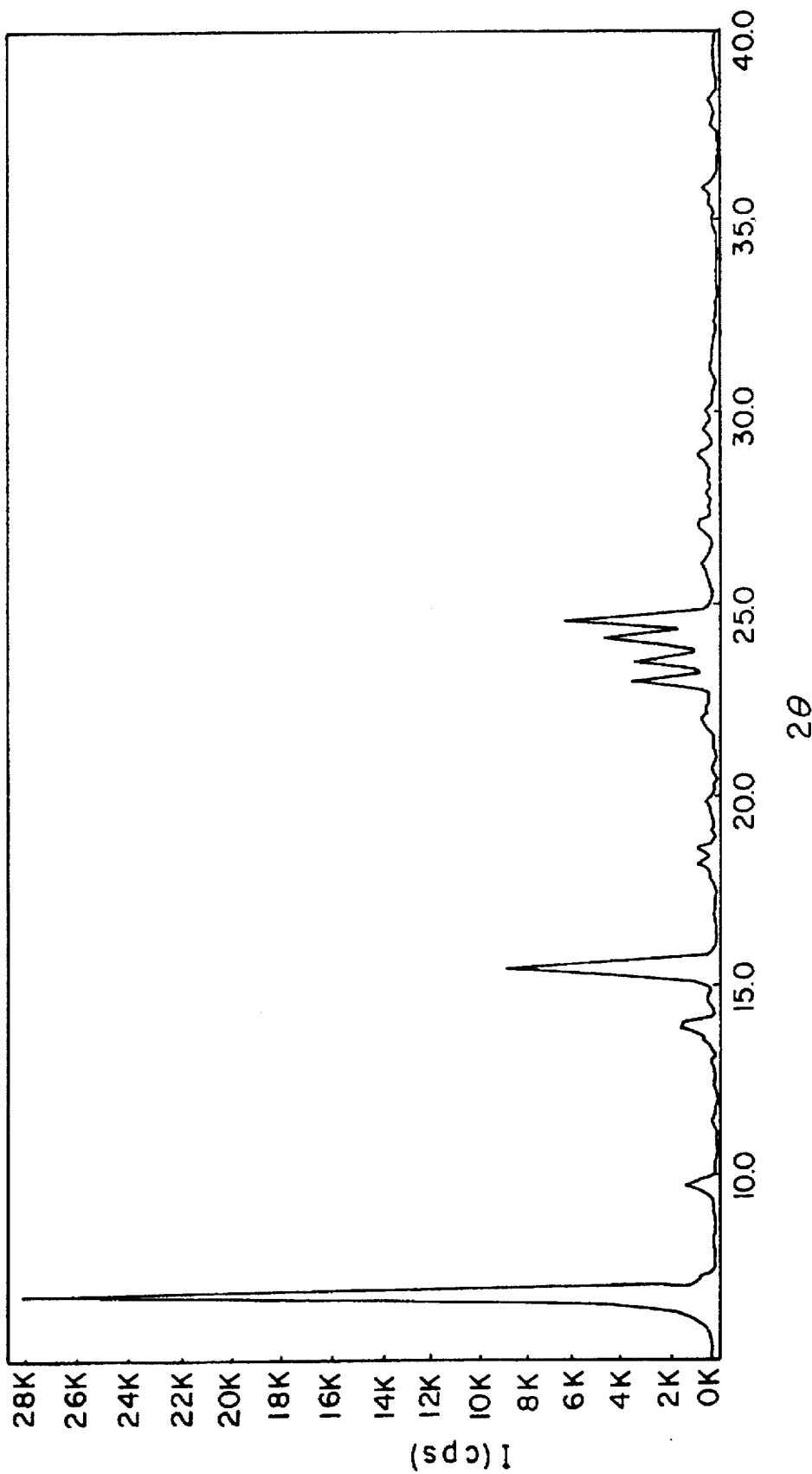
FIG. 1 is a X-ray diffraction spectrum of I-form dimer, which is prepared in Synthesis Example 4.

I-Form dimer is known to the art and it is prepared by, for example the process described below. The wording "I-form dimer" means μ-oxo-aluminum phthalocyanine dimer having conventional polymorph, throughout the specification.

Phthalonitrile or 1,3-diiminoisoindoline is reacted in the presence of aluminum chloride in a high boiling point organic solvent such as 1-chloronaphthalene and quinoline to obtain chloroaluminum phthalocyanine.

The crude chloroaluminum Pc is then purified. That is, it is refluxed with stirring in toluene or 1,3-dioxosilane for about 3 hours, and rinsed with toluene or acetone two or three times. It is then dispersed in ion-exchanged water, stirred at 60° to 70° C. for 1 hour, filtered, rinsed with water, and dried under vacuum.

The resulting chloroaluminum Pc is hydrolyzed to obtain hydroxyaluminum Pc. The process of hydrolysis is known to the art and described in Japanese Patent Kokai Publications No. 93150/1993, and 214415/1994 for example.

For example, the chloroaluminum Pc is hydrolyzed in an acidic or a basic solution, or subjected to acid pasting to prepare hydroxyaluminum Pc.

The resulting hydroxyaluminum Pc is refluxed with stirring in a water immiscible organic solvent such as o-dichlorobenzene, generated water is then excluded from the reaction system, and the product (I-form dimer) is collected by filtration. The product is then washed with DMF and then methanol etc., dried, and ground to obtain the I-form dimer. I-Form dimer (PcAl—O—AlPc) or hydroxyaluminum Pc (HO—AlPc) may specifically be prepared from chloroaluminum Pc (Cl—AlPc) by the method which is described in J. E. Owen; M. E. Kenny, Inorg. Chem., 1, 331–333, 1962.

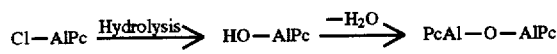

The I-form dimer is dry milled by first. The wording "dry mill" or "dry milling" of the present specification means the step in which the substance is milled by using no solvent, but optionally using a mill medium, on a dispersing machine such as a ball mill, a sand mill, a paint shaker, an attritor, and an automatic mortar. Examples of the mill medium include glass beads, steel beads, and alumina beads.

The resulting μ-oxo-aluminum Pc dimer is no longer the I-form dimer. It has a novel polymorph which shows diffraction peaks at a Bragg angle (2θ±0.2°) of 6.8°, 15.4°, and 24.0° in a X-ray diffraction spectrum by CuK α-ray. The μ-oxo-aluminum Pc dimer having the novel polymorph is referred to as "Pseudo II-form dimer", and the novel polymorph is referred to as "Pseudo II-form polymorph", in the specification.

The dry milling is conducted generally at room temperature for 10 to 100 hours, preferably 24 to 48 hours. If the dry milline is conducted less than 10 hours, formation of the polymorph becomes insufficient, and even if the dry milline is conducted more than 100 hours, useful effect may not be obtained. According to the milling procedure, the Pseudo II-form dimer becomes somewhat amorphus.

The dry milling is for example conducted by using a dispersing machine (a paint shaker for example), until the polymorph become fixed. When 7 g of sample was used in combination with 80 g of glass beads having 5 mmφ, it generally takes 20 to 50 hours.

The resulting Pseudo II-form dimer shows diffraction peaks at a Bragg angle (2θ±0.2°) of 6.8°, 15.4°, and 24.0° in a X-ray diffraction spectrum. The polymorph is novel. The Pseudo II-form dimer may be employed as a charge generator for an electrophotographic photoreceptor as described below.

μ-Oxo-aluminum Pc dimer which has a novel polymorph may further be obtained by using the Pseudo II-form dimer. The Pseudo II-form dimer is wet milled or simply dispersed in a solvent, in that case.

The wording "wet mill" or "wet milling" of the present specification means the step in which the substance is milled by using a solvent. Wet milling is conducted in substantially the same manner as the dry milling, except using a solvent. Thus, a mill medium such as glass beads, steel beads, and alumina beads may be employed in the wet milling. The wording "simply disperse" or "simply dispersing" means the step in which the substance is dispersed with stirring into a solvent. The simply dispersing may optionally be conducted with heating.

The wet milling or simply dispersing is conducted generally at room temperature for 20 to 100 hours, preferably 24 to 48 hours. If the step is conducted less than 10 hours, formation of the polymorph becomes insufficient, and even if the wet milling is conducted more than 100 hours, useful effect may not be obtained.

The wet milling is conducted by using a solvent, until polymorph become fixed. When ethanol is used as the solvent, it takes about 72 hours.

The simply dispersing is conducted by using a solvent, until polymorph become fixed. When cyclohexanone is used as the solvent, for example, it takes about 12 hours under reflux. When diethylene glycol is used as the solvent, it takes about 7 hours at 100° C. When diglyme is used as the solvent, it takes about 11 hours at 162° C.

A solvent employed in the present invention is not particularly limited, unless it solves a pigment. The solvent is generally selected, depending on a kind of the desired polymorph, from a ketone solvent, an alcohol solvent, a glycol solvent, a formamide solvent, an ether solvent, and an aromatic solvent.

Examples of the ketone solvent include linear or cyclic ketones such as cyclohexanone, diisopropyl ketone, methyl ethyl ketone (MEK), methyl isobutyl ketone (MIBK). Examples of the alcohol solvent include monohydric lower alcohols such as methanol, ethanol, propanol, isopropanol, and amyl alcohol. Examples of the glycol solvent include alkylene glycols such as ethylene glycol, diethylene glycol, and trimethylene glycol; alkylene glycol monoalkyl ethers such as ethylene glycol monomethyl ether, ethylene glycol monoethyl ether, propylene glycol monomethyl ether; ethylene glycol dialkyl ethers such as monoglyme, diglyme, triglyme, and tetraglyme. Examples of the formamide solvent include dimethylformamide (DMF), and dimethylacetamide. Examples of the ether solvent include linear or cyclic ethers such as tetrahydrofuran (THF), dioxane, ethyl ether, and butyl ether. Examples of the aromatic solvent include hydrocarbon solvents such as toluene, o-xylene, and tetralin.

Figure 3:
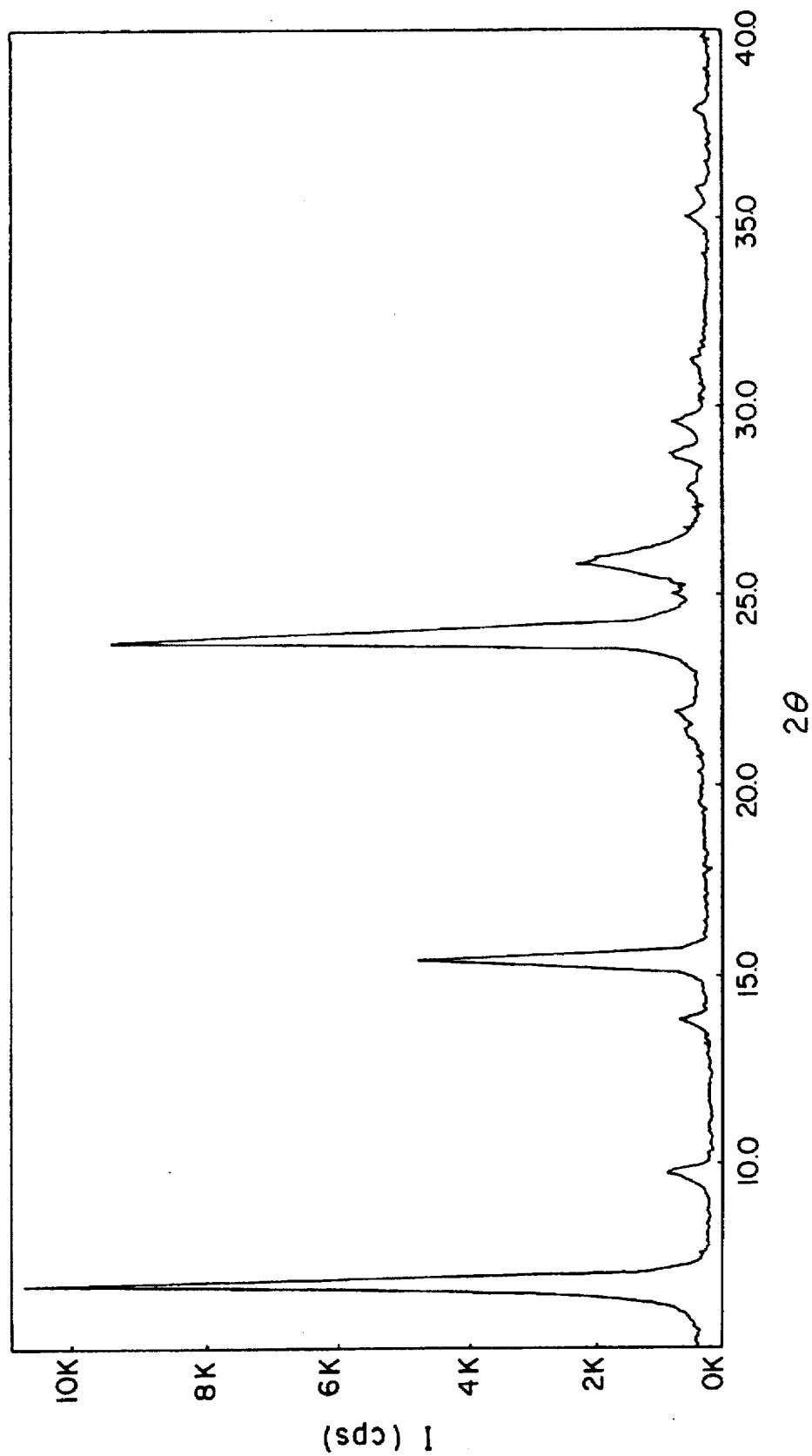
FIG. 3 is a X-ray diffraction spectrum of II-form dimer of the present invention.

When the Pseudo II-form dimer is wet milled or simply dispersed in the ketone solvent such as cyclohexanone and diisopropyl ketone, preferably cyclohexanone; the alcohol solvent such as amyl alcohol, and ethanol; the glycol solvent such as DMF; and the ether solvent such as THF; the II-form dimer having II-form polymorph is obtained. A X-ray diffraction spectrum of the II-form dimer is shown in FIG. 3. The spectrum of FIG. 3 is clearly different from that of FIG. 1, and the polymorph of II-form dimer is different from that of I-form dimer. The II-form dimer may be employed as a charge generator for an electrophotographic photoreceptor as described below, and it has good photosensitive property.

Figure 4:
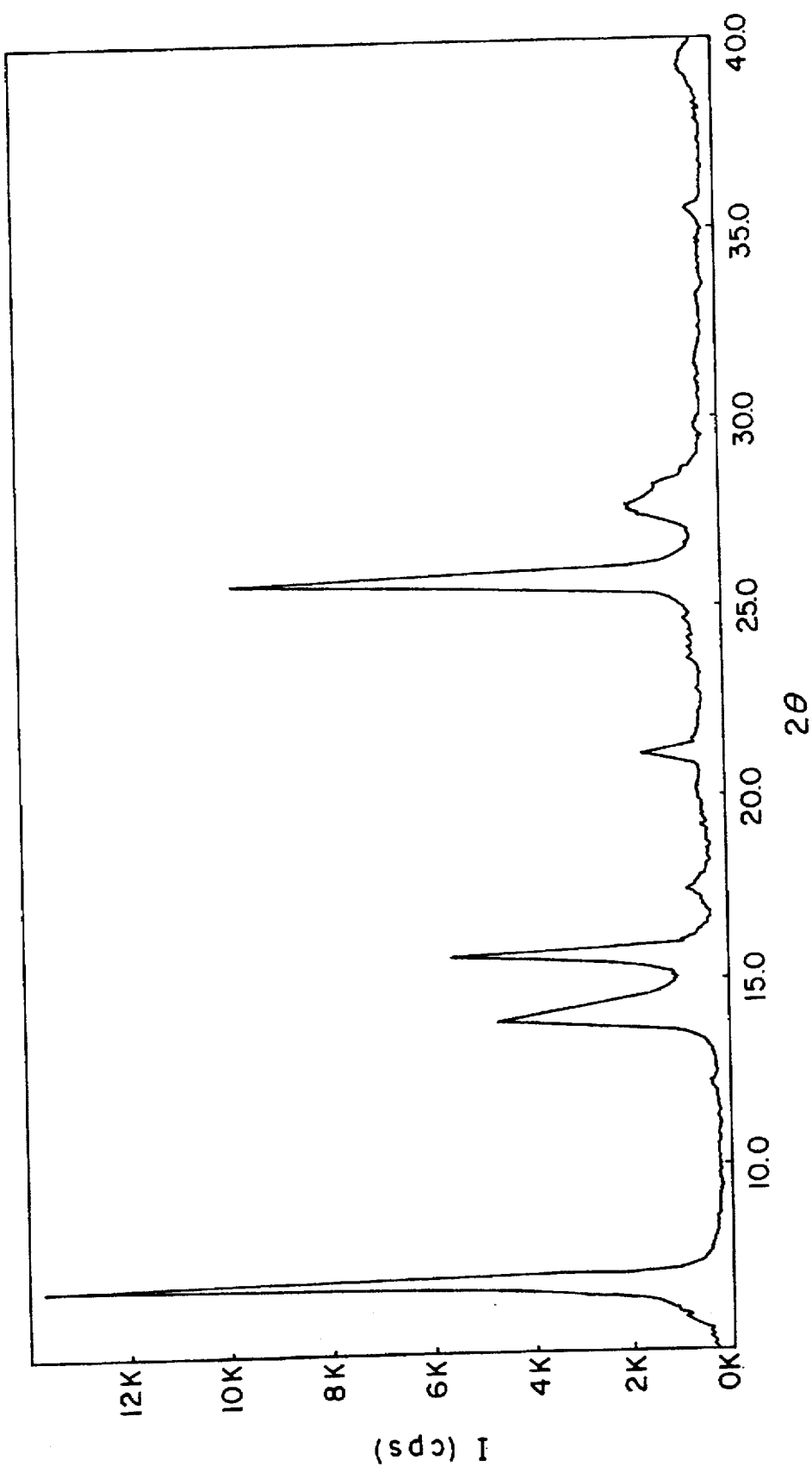
FIG. 4 is a X-ray diffraction spectrum of III-form dimer of the present invention.

When the Pseudo II-form dimer is wet milled or simply dispersed in the glycol solvent such as ethylene glycol, µ-oxo-aluminum Pc dimer having a novel polymorph which shows diffraction peaks at a Bragg angle (2θ±0.2°) of 6.9°, 14.0°, 15.7°, and 25.7° in a X-ray diffraction spectrum is obtained. The µ-oxo-aluminum Pc dimer having the novel polymorph is referred to as "III-form dimer". A X-ray diffraction spectrum of the III-form dimer is shown in FIG. 4. The spectrum of FIG. 4 is clearly different from that of FIG. 1, and the polymorph of III-form dimer is different from that of I-form dimer. III-Form dimer may be employed as a charge generator for an electrophotographic photoreceptor as described below.

Figure 5:
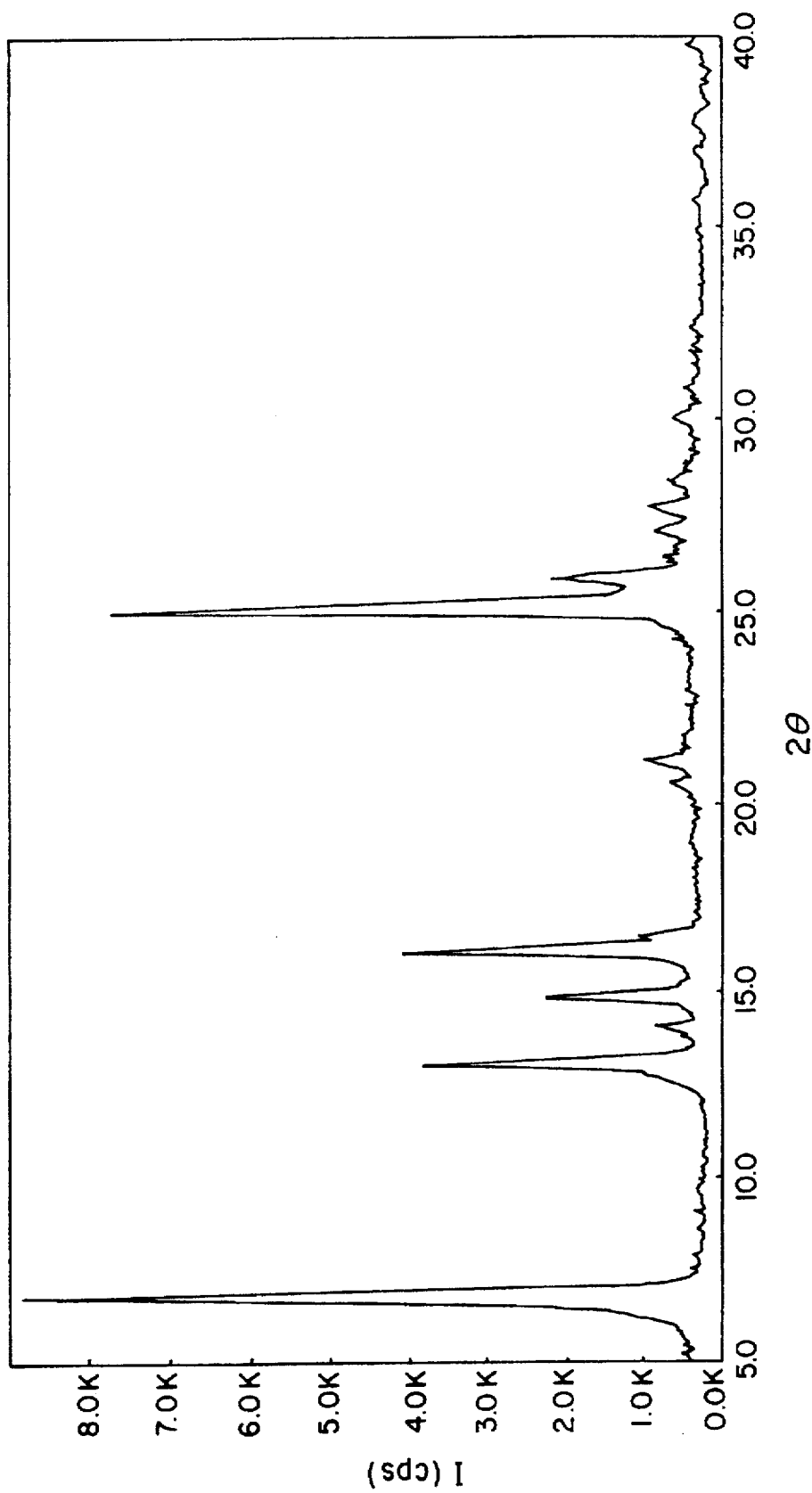
FIG. 5 is a X-ray diffraction spectrum of IV-form dimer of the present invention.

When the Pseudo II-form dimer is wet milled or simply dispersed in ethylene glycol dialkyl ethers such as monoglyme, diglyme, triglyme, tetraglyme and the like, µ-oxo-aluminum Pc dimer having a novel polymorph which shows diffraction peaks at a Bragg angle (2θ±0.2°) of 6.9°, 13.0°, 14.8°, 16.1°, 21.1°, 25.1° and 25.8° in a X-ray diffraction spectrum, is obtained. The µ-oxo-aluminum Pc dimer having the novel polymorph is referred to as "IV-form dimer". A X-ray diffraction spectrum of the IV-form dimer is shown in FIG. 5. The spectrum of FIG. 5 is clearly different from that of FIG. 1, and the polymorph of IV-form dimer is different from that of I-form dimer. IV-Form dimer may be employed as a charge generator for an electrophotographic photoreceptor as described below.

µ-Oxo-aluminum Pc dimer having a novel polymorph of the present invention is preferably employed as a photoconductive material for use in an electrophotographic photoreceptor which is widely applied to a copying machine using electrophotographic technology.

The photoconductive material comprising µ-oxo-aluminum Pc dimer of the present invention as an effective ingredient provides good chargeability, high sensitivity, and high durability, when it is applied as a charge generating layer of an electrophotographic receptor.

The electrophotographic receptor generally has a conductive substrate, and a photoconductive layer formed thereon which comprises a charge generator and a charge transporting material. The photoconductive layer may be classified depending on its structure, i.e., a mono-layered one and a bi-layered one. µ-Oxo-aluminum Pc dimer of the present invention may be employed in both the mono-layered photoconductive layer and the bi-layered photoconductive layer.

But, it is preferred that µ-oxo-aluminum Pc dimer of the present invention is applied to the bi-layered photoconductive layer, because each of the layers in the bi-layered photoconductive layer do not inhibit the respective functions, and they efficiently transfer the generated charge to a surface of the electrophotographic photoreceptor without trapping the charge, and therefore, electronic property of the µ-oxo-aluminum Pc dimer may sufficiently be exhibited. The electrophotographic photoreceptor which has bi-layered construction is generally called as a function separated-form photoreceptor.

The function separated-form photoreceptor is prepared by, for example, forming a charge generating layer on a conductive substrate, and forming a charge transporting layer thereon. Examples of the conductive substrate include metal (e.g., aluminum, nickel), metal vapor-deposited film and the like, in the form of a drum, a sheet or a belt.

µ-oxo-aluminum Pc dimer of the present invention may, be included as a charge generator in the charge generating layer. The charge generating layer is formed as a thin layer on the conductive substrate. It can be formed by vapor-depositing the µ-oxo-aluminum Pc dimer, but is generally formed by applying a binder resin dispersion of the µ-oxo-aluminum Pc dimer. The binder resin dispersion may be prepared by dispersing the µ-oxo-aluminum Pc dimer into a solution of a suitable binder resin, using a usual dispersing apparatus such as ball mill, sand mill, paint shaker and the like.

A process for coating the binder resin dispersion is not specifically limited, and suitably include bar coating, dip coating, spin coating, roller coating, calendar coating and the like. The coated layer may be dried at a temperature of 30° to 200° C. for 5 minutes to 2 hours in the presence or absence of blast.

A solvent optionally be employed for preparing the dispersion. The solvent employed in the present invention is not particularly limited, unless it solves a pigment. However, a solvent which may disperse a pigment uniformly and may solve a binder resin, is preferred. Examples thereof include alcohol solvents such as methanol, ethanol, isopropanol and butanol; aromatic solvents such as toluene, xylene and tetralin; halogenated solvents such as dichloromethane, chloroform, trichloroethylene and carbon tetrachloride; ester solvents such as ethyl acetate and propyl acetate; ether solvents such as ethylene glycol monoethyl ether, dioxane and tetrahydrofuran; dimethylformamide and dimethyl sulfoxide.

The binder resin can be selected from a wide range of insulating resins. Examples of the preferred resin include condensation resins such as polycarbonate, polyacrylate, polyester and polyamide; addition polymers such as polystyrene, styrene-acrylic copolymer, polyacrylate, polymethacrylate, polyvinyl butyral, polyvinyl alcohol, polyacrylonitrile, polyacrylic-butadiene copolymer, polyvinyl chloride and vinyl chloride-vinyl acetate copolymer; organic photoconductive resins such as poly-N-vinyl carbazole and polyvinylanthracene; polysulfone, polyether sulfone, silicone resin, epoxy resin and urethane resin. These are used alone or in combination thereof.

The binder resin is employed in an amount of from 0.1 to 3 ratio by weight, preferably 0.5 to 2.0 by weight based on the charge generator. When the amount is more than 3, the amount of charge decreases, and sensitivity of the photoconductive layer becomes poor. The charge generating layer is preferably formed in a thickness of from 0.05 to 5.0 µm, preferably 0.1 to 3.0 µm. When the thickness is more than 5.0 µm, charge may readily be trapped, and sensitivity of the photoconductive layer becomes poor.

A charge transporting layer containing a charge transporting material is then formed on the charge generating layer.

This layer may be formed in the same manner as described above, for forming the charge generating layer. That is, the charge transporting material is dissolved in a solvent with a binder resin, and the resulting solution is uniformly applied on the charge generating layer, followed by drying.

Examples of the charge transporting material include conventional materials such as an oxadiazole derivative, a pyrazoline derivative, a hydrazone derivative, a triazine derivative, a quinazoline derivative, a triarylamine compound, a styryltriphenylamine compound, a butadiene compound, and a carbazole compound.

Examples of the binder resin and solvent include the same materials as that employed for the charge generating layer.

The binder resin is employed in an amount of from 0.1 to 5 ratio by weight, preferably 0.5 to 2.0 ratio by weight based on the charge transporting material. When the amount is more than 5, concentration of the charge transporting material in the charge transporting layer becomes small, and sensitivity of the photoconductive layer becomes poor. The charge transporting layer is preferably formed in a thickness of from 5 to 50 μm, preferably 10 to 40 μm. When the thickness is more than 50 μm, long time is required for transporting charge, and the charge may readily be trapped, and thereby sensitivity of the photoconductive layer becomes poor.

EXAMPLES

The following Examples and Comparative Examples further illustrate the present invention in detail but are not to be construed to limit the scope thereof.

The X-ray diffraction spectrum by CuK α-ray was measured by using the automatic X-ray diffraction system "MXP3" manufactured by Max Science Co. Ltd., and TOF-MS (Time of Flight Mass Spectroscopy) was measured by using "COMPACT MALDI III" manufactured by Kratos-Shimazu Co. Ltd., in the detection mode "Positive", the voltage "Low (5 kV)", and the flying mode "Reflection", in the Examples.

Synthesis Example 1

Synthesis of chloroaluminum Pc 60.0 g of phthalonitrile, 300 ml of 1-chloronaphthalene, and 15.6 g of aluminum chloride were charged in a 1000 ml glass four-necked flask equipped with requisite apparatuses such as a stirrer, a calcium chloride tube and the like, and the mixture was refluxed with stirring for 6 hours. Heating was then stopped and the mixture was cooled to about 200° C., and hot filtered and washed with 600 ml of hot toluene, and 300 ml of acetone.

Figure 7:
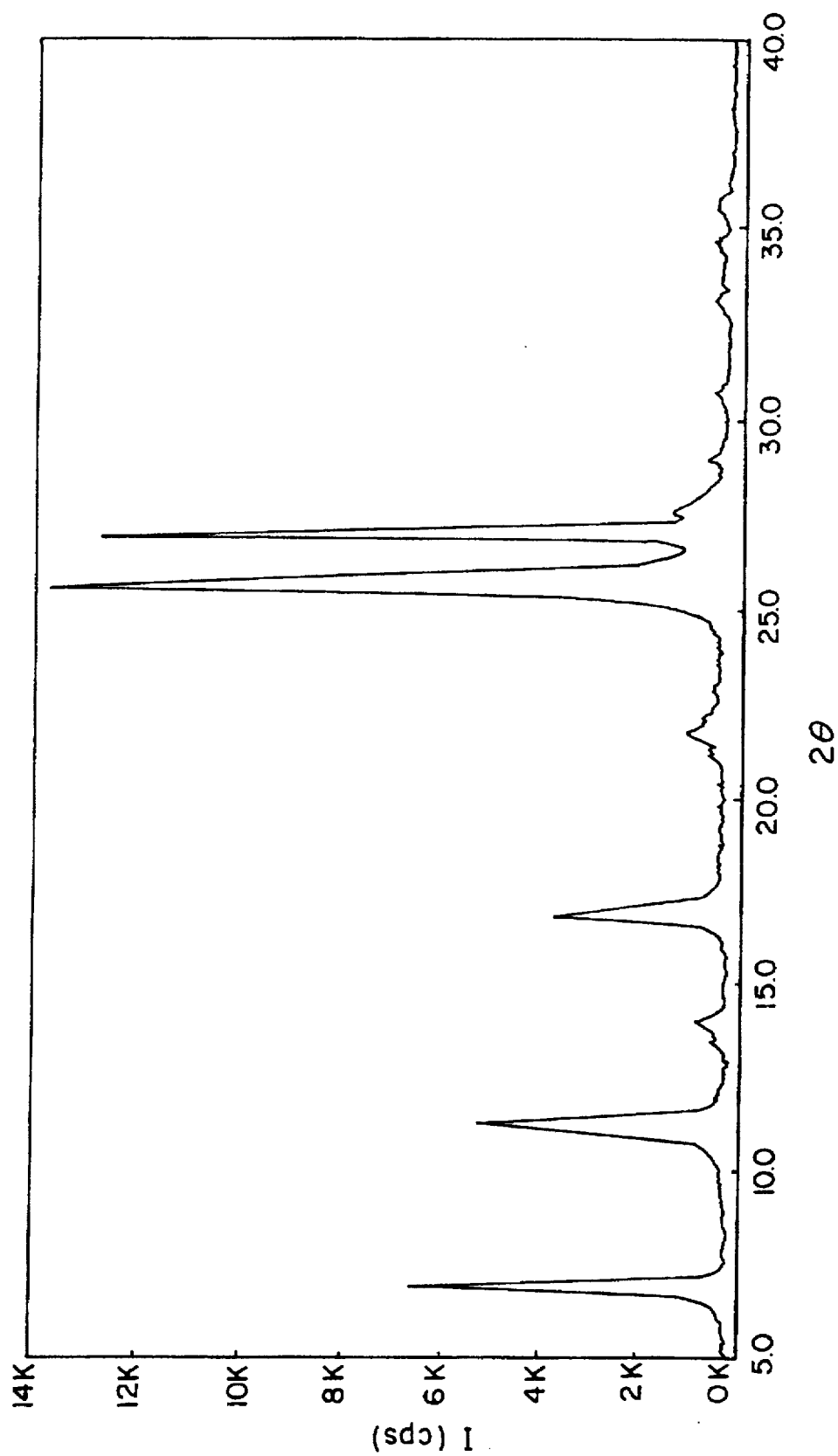
FIG. 7 is a X-ray diffraction spectrum of chloroaluminum Pc, which is prepared in Synthesis Example 1.

The resulting wet cake was dispersed in 250 ml of toluene, and refluxed with stirring for 3 hours. The mixture was hot filtered, and washed again with 600 ml of hot toluene and 300 ml of acetone. The product was then dispersed in 1500 ml of ion exchanged water, and heated to 60° to 70° C. with stirring for 60 min. The mixture was filtered, and vacuum dried at 50° C. to obtain 61.1 g of blue solid chloroaluminum Pc (yield 91.2%). A X-ray diffraction spectrum of the product was shown in FIG. 7.

Synthesis Example 2

Synthesis of chloroaluminum Pc

Figure 8:
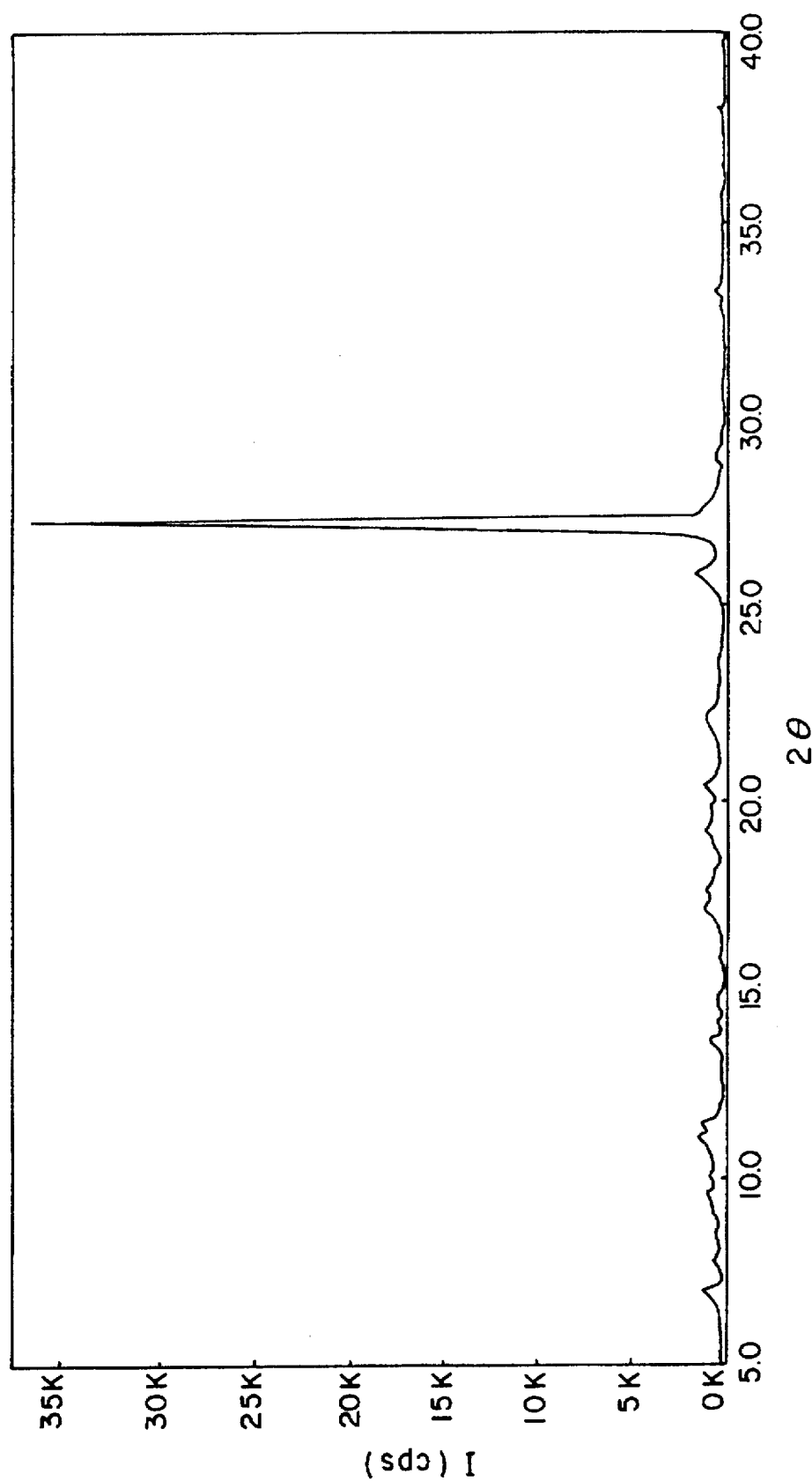
FIG. 8 is a X-ray diffraction spectrum of chloroaluminum Pc, which is prepared in Synthesis Example 2.

Chloroaluminum Pc was prepared according to substantially the same manner as described in Synthesis Example 1, except that 1,3-dioxosilane was used as a solvent for dispersing and washing instead of toluene. The product was 61.1 g (yield 90.8%) of blue solid. A X-ray diffraction spectrum of the product was shown in FIG. 8.

Synthesis Example 3

Figure 9:
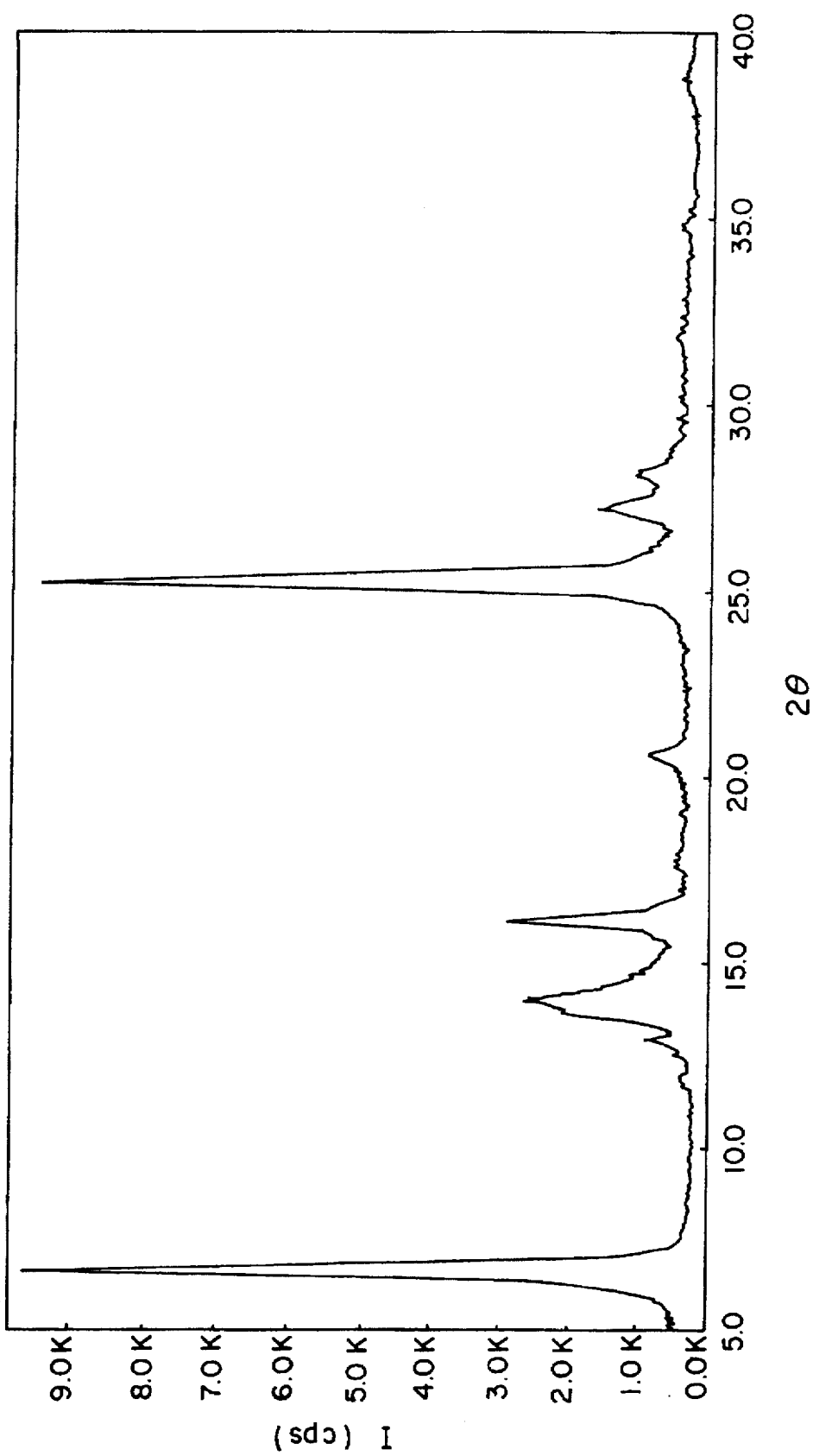
FIG. 9 is a X-ray diffraction spectrum of hydroxyaluminum Pc, which is prepared in Synthesis Example 3.

Synthesis of hydroxyaluminum Pc 30.0 g of chloroaluminum Pc prepared in Synthesis Example 1 or 2 was slowly added to 1200 g of sulfonic acid, with controlling a temperature thereof between 0° to 5° C., and the mixture was stirred for 1 hour. The mixture was then poured into 6000 ml of ice water with stirring and controlling at a temperature thereof not more than 5° C., and stirred for 1 hour. The resulting mixture was filtered and washed with water, and was dispersed in 6500 ml of ion exchanged water, and filtered again. The wet cake was washed with water, dispersed in 2500 ml of aqueous ammonia, and filtered again. The cake was thoroughly washed with water, dried under vacuum at 50° C., and ground to obtain 21.8 g of blue solid hydroxyaluminum Pc (yield 74.9%). A X-ray diffraction spectrum of the product was shown in FIG. 9.

Synthesis Example 4

Figure 10:
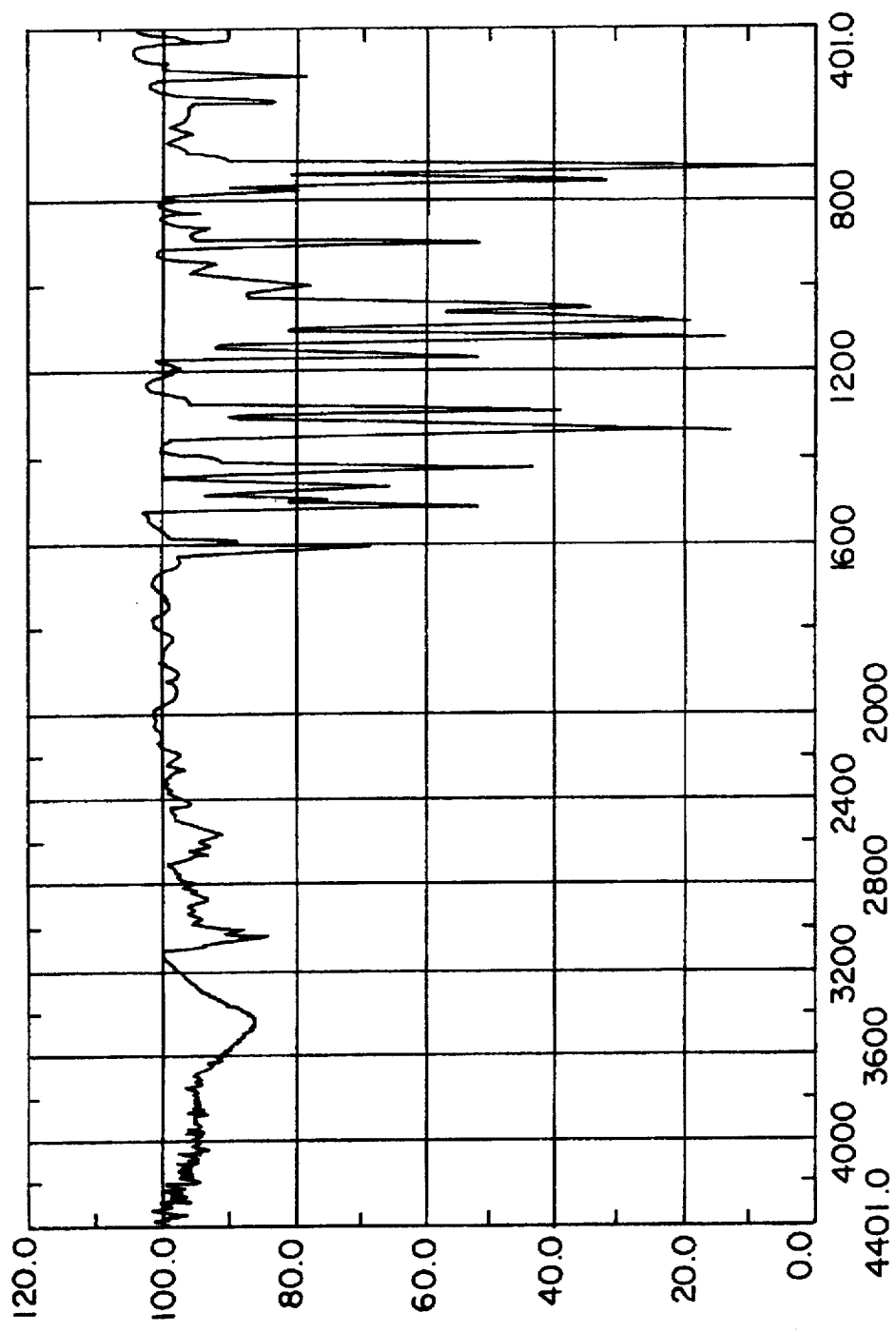
FIG. 10 is an infrared absorption spectrum of I-form μ-oxo-aluminum Pc dimer, which is prepared in Synthesis Example 4.

Synthesis of I-form dimer 20.0 g of hydroxyaluminum Pc prepared in Synthesis Example 3 was added to 200 ml of o-dichlorobenzene, and the mixture was stirred at a temperature between 150° to 180° C. The vaporized water was removed through Liebig condenser equipped beforehand. When generation of water stopped, the Liebig condenser was replaced with an air cooling condenser, the mixture was refluxed with stirring for 7 hours, and filtered. The cake was washed with DMF, and then with methanol in order to remove DMF. The product was dried, and ground to obtain 16.4 g of μ-oxo-aluminum Pc dimer (yield 82.5%). This is I-form dimer having the polymorph which shows diffraction peaks as shown in FIG. 1. An infrared absorption spectrum of the product was shown in FIG. 10. The results of elemental analysis were shown in Table 1. The diffraction peaks in the X-ray diffraction spectrum of the product was a Bragg angle (2θ±0.2°) of 6.9°, 15.5°, 23.0°, 23.5°, 24.2°, and 24.6°.

TABLE 1

|  | C | H | N | Cl | Al |
|---|---|---|---|---|---|
| Theory % | 70.20 | 2.65 | 20.47 | — | 4.93 |
| Found % | 69.13 | 3.12 | 19.97 | — | 4.49 |

Example 1

Synthesis of Pseudo II-form dimer 7.0 g of I-form dimer prepared in Synthesis Example 4, and 80 g of glass beads having a diameter of 5 mmφ were charged in a wide-mouthed bottle, and the mixture was dry milled for 1 to 2 days using a dispersing apparatus (paint shaker). The polymorph of the mixture was followed by sampling a part of the mixture. When the polymorph became fixed, the glass beads were filtered out, and 6.64 g of blue solid μ-oxo-aluminum Pc dimer was obtained.

Figure 2:
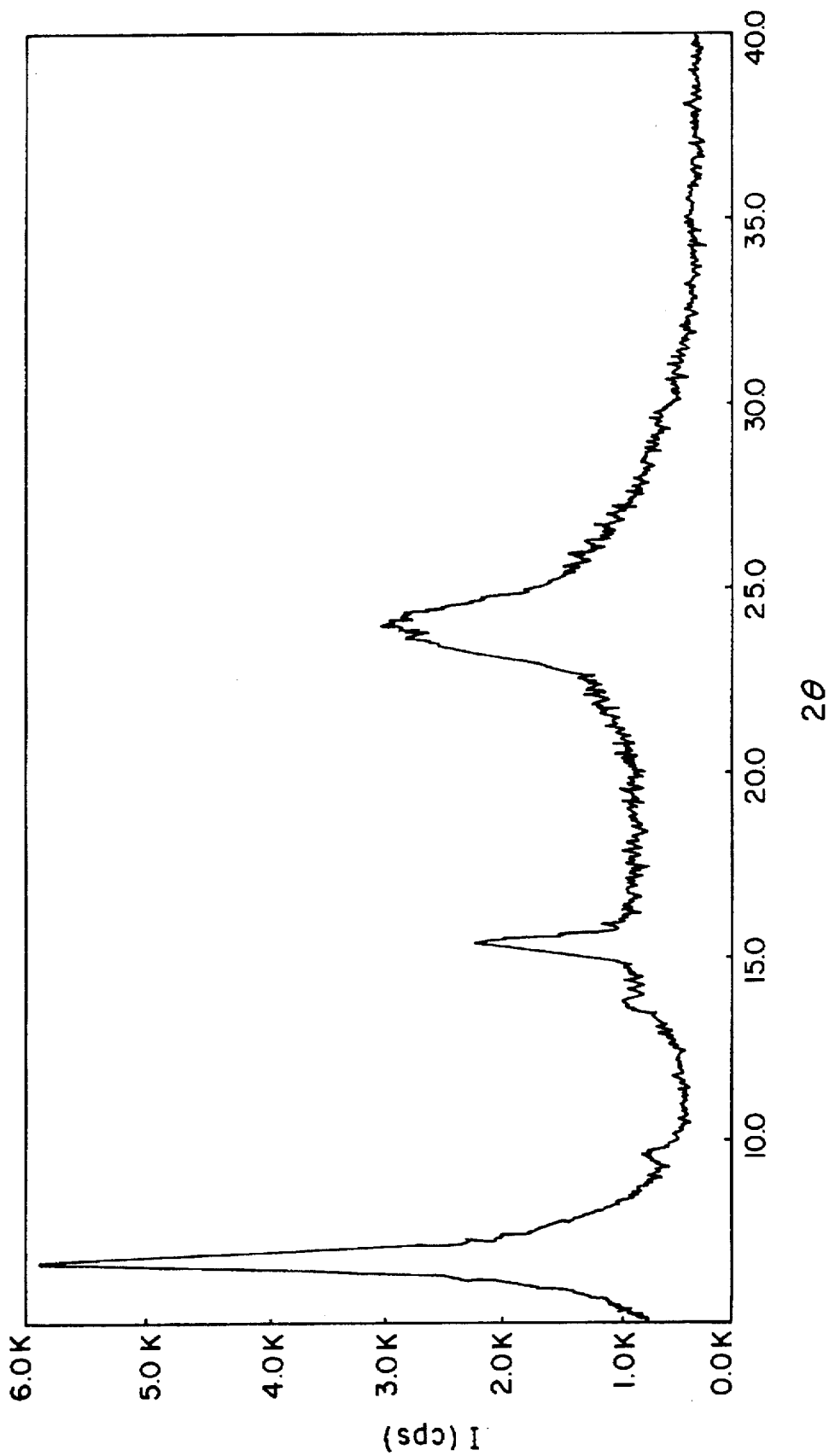
FIG. 2 is a X-ray diffraction spectrum of Pseudo II-form dimer, which is prepared in Example 1.
Figure 6:
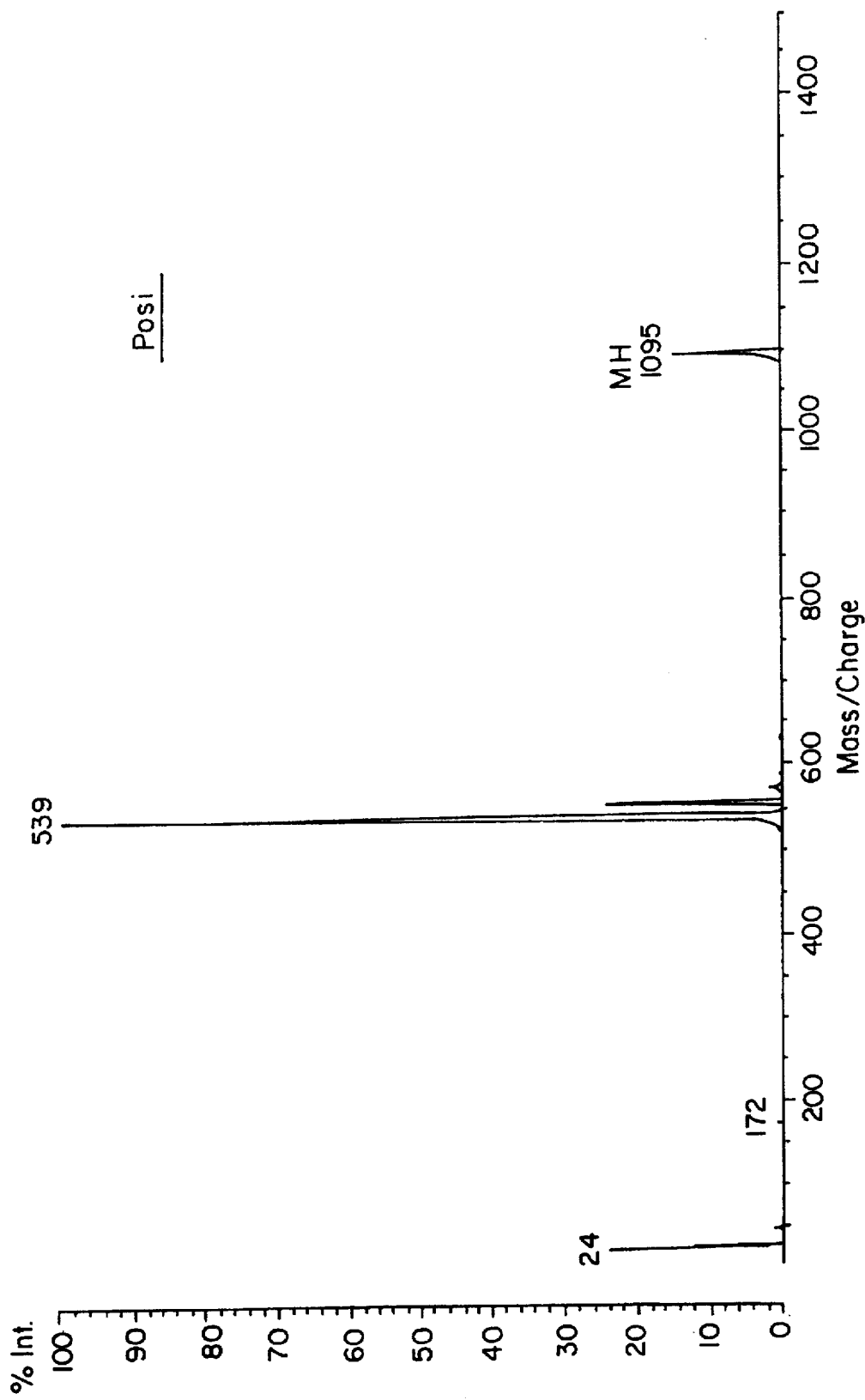
FIG. 6 is a TOF-MS spectrum of μ-oxo-aluminum phthalocyanlne dimer of the present invention.
Figure 11:
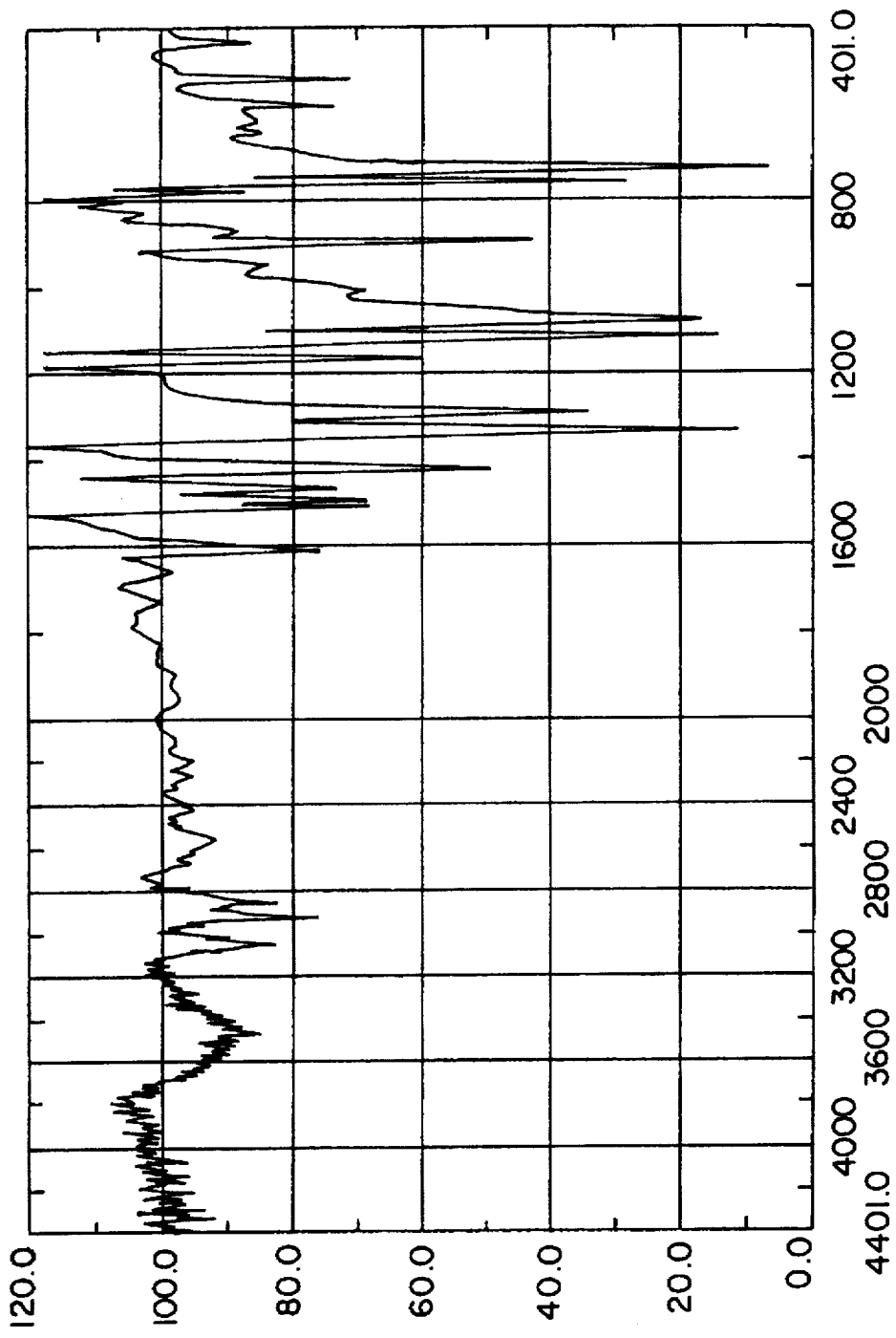
FIG. 11 is an infrared absorption spectrum of Pseudo II-form μ-oxo-aluminum Pc dimer, which is prepared in Example 1.

A X-ray diffraction spectrum of the product was shown in FIG. 2, an infrared absorption spectrum was shown in FIG. 11, and the result of TOF-MS was shown in FIG. 6. Further, the results of elemental analysis were shown in Table 2.

TABLE 2

|  | C | H | N | Cl | Al |
|---|---|---|---|---|---|
| Theory % | 70.20 | 2.95 | 20.47 | — | 4.93 |
| Found % | 70.60 | 3.12 | 21.27 | — | 4.41 |

The above described results show that the product is μ-oxo-aluminum Pc dimer, and the X-ray diffraction spectrum shows that the μ-oxo-aluminum Pc dimer is Pseudo II-form dimer which shows diffraction peaks at a Bragg angle (2θ±0.2°) of 6.8°, 15.4°, and 24.0°.

Example 2

Synthesis of II-form dimer 1.0 g of Pseudo II-form dimer prepared in Example 1 was added to 30 ml of cyclohexane, and the mixture was refluxed with stirring (simply dispersed) for 12 hours. The mixture was allowed to cool, and filtered. The wet cake was washed with methanol and dried under vacuum to obtain 0.5 g of blue solid μ-oxo-aluminum Pc dimer.

Figure 12:
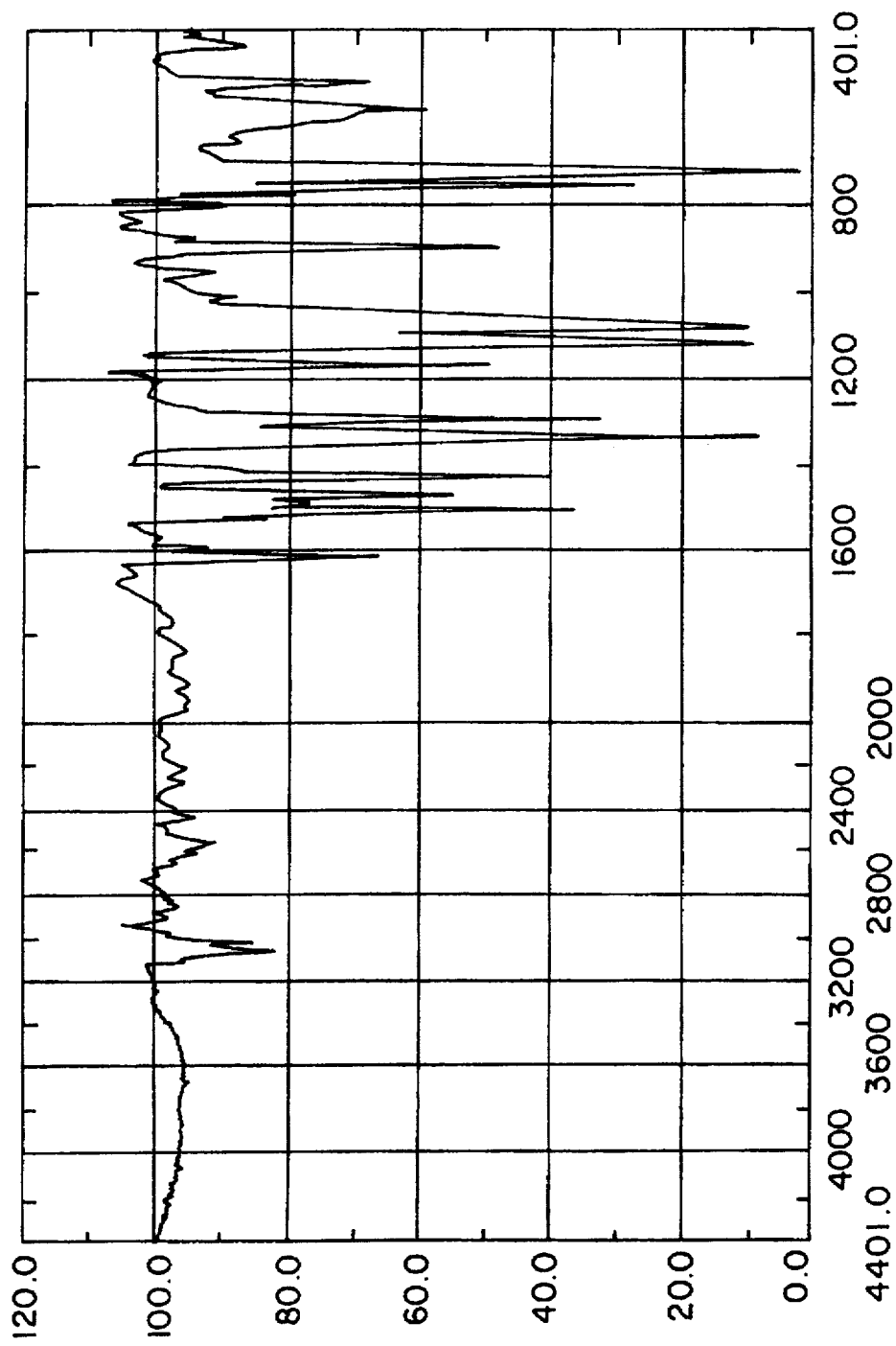
FIG. 12 is an infrared absorption spectrum of II-form μ-oxo-aluminum Pc dimer of the present invention.

A X-ray diffraction spectrum of the product was shown in FIG. 3, an infrared absorption spectrum was shown in FIG. 12. The result of TOF-MS was substantially the same as FIG. 6. Further, the results of elemental analysis were shown in Table 3.

TABLE 3

|  | C | H | N | Cl | Al |
|---|---|---|---|---|---|
| Theory % | 70.20 | 2.95 | 20.47 | — | 4.93 |
| Found % | 70.40 | 3.29 | 21.06 | — | 4.70 |

The above described results show that the product is μ-oxo-aluminum Pc dimer, and the X-ray diffraction spectrum shows that the μ-oxo-aluminum Pc dimer is II-form dimer which shows diffraction peaks at a Bragg angle (2θ±0.2°) of 6.9°, 9.7°, 13.8°, 15.4°, 23.9°, and 25.9°.

Examples 3 to 10

Synthesis of II-form dimer

II-form dimer of the present invention was prepared according to substantially the same manner as described in Example 2, except that the solvent tabulated in table 4 was used instead of cyclohexanone, and the conditions tabulated in table 4 were used.

A X-ray diffraction spectrum, an infrared absorption spectrum, and the result of TOF-MS were substantially the same as those of Example 2.

TABLE 4

| Ex. No. | Solvent | Condition Temp (°C.) | Time | Procedure | Polymor.[1] |
|---|---|---|---|---|---|
| 3 | DMF | reflux | 12 | simply disp. | II |
| 4 | Amyl alcohol | reflux | 12 | simply disp. | II |
| 5 | THF | reflux | 12 | simply disp. | II |
| 6 | Trimethylene glycol | 150 | 5 | simply disp. | II |
| 7 | o-Xylene | reflux | 26 | simply disp. | II |
| 8 | Diethylene glycol | 100 | 7 | simply disp. | II |
| 9 | Ethanol | room temp. | 72 | wet milling | II |

TABLE 4-continued

| Ex. No. | Solvent | Condition Temp (°C.) | Time | Procedure | Polymor.[1] |
|---|---|---|---|---|---|
| 10 | Diisopropyl ketone | reflux | 12 | simply disp. | II |

[1]Polymorph of the resulting μ-oxo-aluminum Pc dimer.

Example 11

Synthesis of III-form dimer 1.0 g of Pseudo II-form dimer prepared in Example 1 was added to 30 ml of ethylene glycol, and the mixture was stirred (simply dispersed) at 100° C. for 6.5 hours. The mixture was allowed to cool, and filtered. The wet cake was washed with ion exchanged water and dried under vacuum to obtain 0.69 g of blue solid μ-oxo-aluminum Pc dimer.

Figure 13:
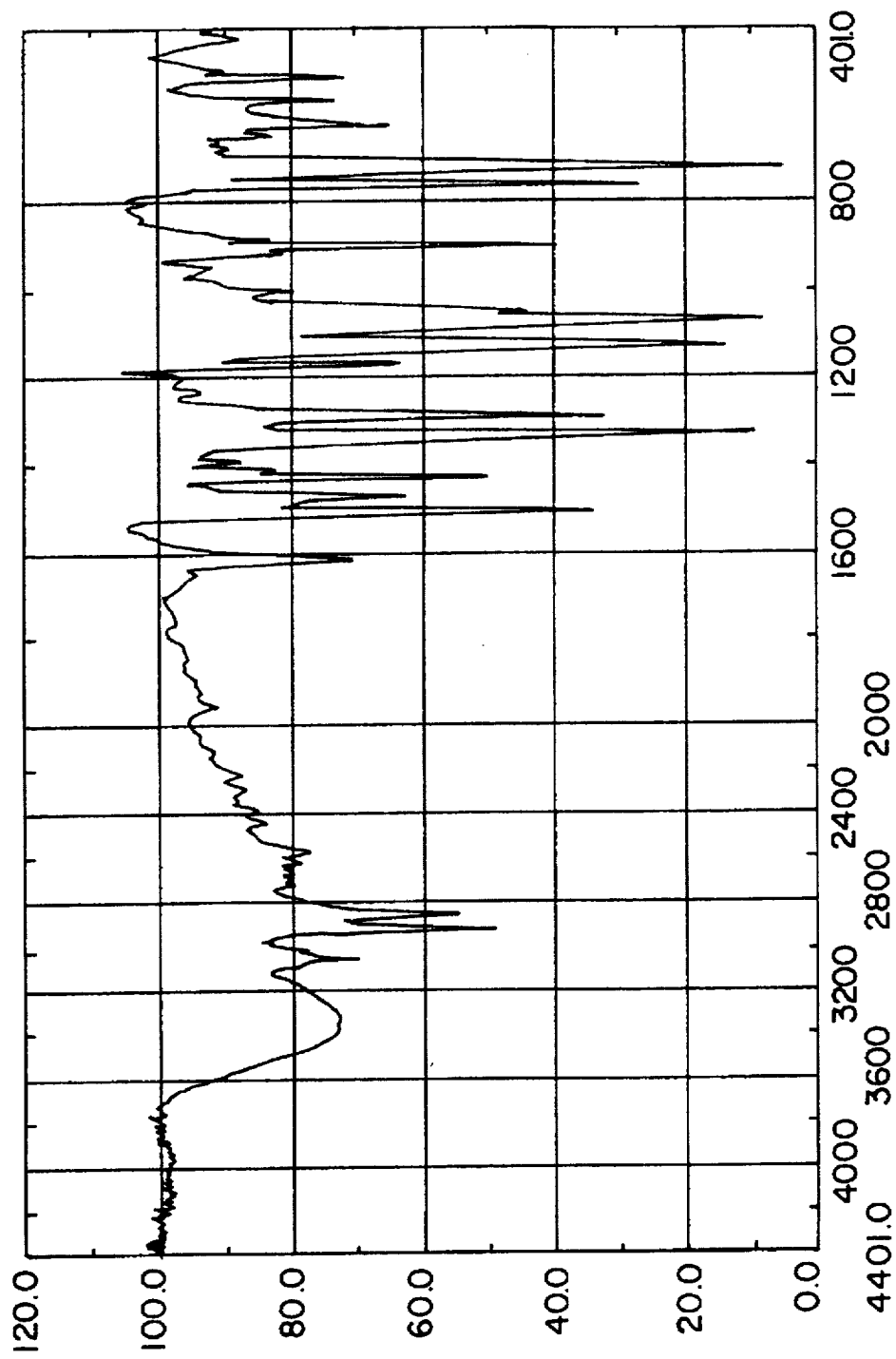
FIG. 13 is an infrared absorption spectrum of III-form μ-oxo-aluminum Pc dimer of the present invention.
Figure 14:
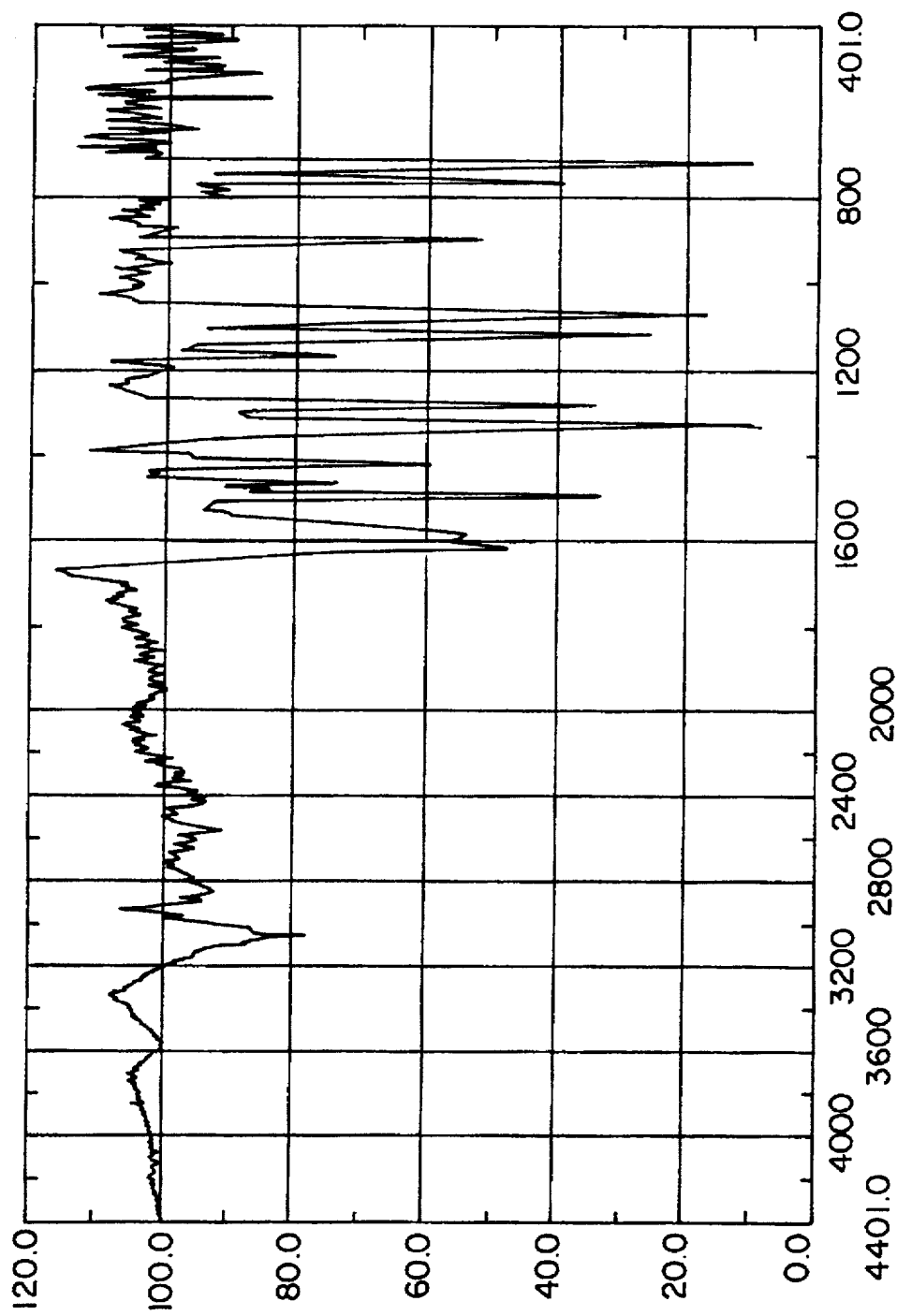
FIG. 14 is an infrared absorption spectrum of IV-form μ-oxo-aluminum Pc dimer of the present invention.

A X-ray diffraction spectrum of the product was shown in FIG. 4, and an infrared absorption spectrum was shown in FIG. 13. The result of TOF-MS was substantially the same as FIG. 6. Further, the results of elemental analysis were shown in Table 5.

TABLE 5

|  | C | H | N | Cl | Al |
|---|---|---|---|---|---|
| Theory % | 70.20 | 2.95 | 20.47 | — | 4.93 |
| Found % | 70.49 | 3.24 | 19.95 | — | 4.67 |

The above described results show that the product is μ-oxo-aluminum Pc dimer, and the X-ray diffraction spectrum shows that the μ-oxo-aluminum Pc dimer is III-form dimer which shows diffraction peaks at a Bragg angle (2θ±0.2°) of 6.9°, 14.0°, 15.720 , and 25.7°.

Example 12

Synthesis of IV-form dimer 0.7 g of Pseudo II-form dimer prepared in Example 1 was added to 30 ml of diglyme, and the mixture was refluxed with stirring (simply dispersed) at 162° C. for 11 hours. The mixture was allowed to cool, and filtered. The wet cake was washed with methanol and dried under vacuum to obtain 0.37 g of blue solid μ-oxo-aluminum Pc dimer.

A X-ray diffraction spectrum of the product was shown in FIG. 5. The result of TOF-MS was substantially the same as FIG. 6. Further, the results of elemental analysis were shown in Table 6.

TABLE 6

|  | C | H | N | Cl | Al |
|---|---|---|---|---|---|
| Theory % | 70.20 | 2.95 | 20.47 | — | 4.93 |
| Found % | 70.49 | 3.24 | 19.95 | — | 4.67 |

The above described results show that the product is μ-oxo-aluminum Pc dimer, and the X-ray diffraction spectrum shows that the μ-oxo-aluminum Pc dimer is IV-form dimer which shows diffraction peaks at a Bragg angle (2θ±0.2°) of 6.9°, 13.0°, 14.8°, 16.1°, 21.1°, 25.1°, and 25.8°.

The condition of Examples 11 and 12 is summarized in the following table 7.

TABLE 7

| Ex. No. | Solvent | Condition Temp (°C.) | Time | Procedure | Polymor.[1] |
|---|---|---|---|---|---|
| 11 | Ethylene glycol | 100 | 6.5 | simply disp. | III |
| 12 | Diglyme | 162 | 11 | simply disp. | IV |

[1]Polymorph of the resulting μ-oxo-aluminum Pc dimer.

Example 13

The present example illustrates a function separated-form electrophotographic photoreceptor to which the μ-oxo-aluminum Pc dimer having a novel polymorph of the present invention was applied. The Pseudo II-form dimer prepared in Example 1 was employed as a charge generator (CG material).

0.2 g of the Pseudo II-form dimer, 0.2 g of a polyvinyl butyral resin ("Elex BH-3" available from Sekisui Kagaku K.K.), 59.6 g of cyclohexanone, and 50 g of glass beads having a diameter of 3 mmφ were charged in a wide-mouthed bottle. The mixture was shook for 1 hour using a dispersing apparatus (paint shaker), and applied on an aluminum plate by a bar coater. The coating was dried in air to form a charge generating layer having a thickness of 0.5 μm.

1.5 g of 1,1-bis(p-diethylaminophenyl)-4,4'-diphenyl-1,3-butadiene ("T-405" available from Takasa Koryo K.K.), 1.5 g of a polycarbonate resin ("L-1250" available from Teijin K.K.), and 57.0 g of methylene chloride were charged in a wide-mouthed bottle. The mixture was homogenized by using supersonic wave, and applied on the charge generating layer by a bar coater. The coating was dried in air to form a charge transporting layer having a thickness of 20 μm. Thereby, a bi-layered electrophotographic photoreceptor was prepared.

Example 14

An electrophotographic photoreceptor was prepared according to substantially the same manner as described in Example 13, except that 4-benzylamino-2-methylbenzaldehyde-1,1'-diphenylhydorazone ("CTC-191" manufactured by Takasa Koryo K.K.) was used as CT material instead of 1,1-bis(p-diethylaminophenyl)-4,4'-diphenyl-1,3-butadiene.

Examples 15 to 36

Electrophotographic photoreceptors of the present invention were prepared according to substantially the same manner as described in Example 13, except that the materials tabulated in the following Table 8 were used as CG material and CT material.

Comparative Example 1

An electrophotographic photoreceptor was prepared according to substantially the same manner as described in Example 14, except that Y-form titanyl Pc which was prepared according to the procedure described in Japanese Patent Kokoku Publication No. 35084/1991 (Konica K.K.) was used as CG material instead of the Pseudo II-form dimer.

Comparative Example 2

An electrophotographic photoreceptor was prepared according to substantially the same manner as described in Example 13, except that X-form nonmetallo-Pc which was prepared according to the procedure described in Japanese Patent Kokoku Publication No. 78872/1991 was used in CG material instead of the Pseudo II-form dimer.

Comparative Example 3

An electrophotographic photoreceptor was prepared according to substantially the same manner as described in Example 14, except that hydroxyaluminum Pc which was prepared according to the procedure described in Japanese Patent Kokai Publication No. 93150/1993 (Fuji Xerox K.K.) was used as CG material instead of the Pseudo II-form dimer.

Comparative Example 4

An electrophotographic photoreceptor was prepared according to substantially the same manner as described in Example 13, except that the I-form dimer which was prepared in Synthesis Example 4 was used as CG material instead of the Pseudo II-form dimer.

Comparative Example 5

An electrophotographic photoreceptor was prepared according to substantially the same manner as described in Example 13, except that the I-form dimer which was prepared in Synthesis Example 4 was used as CG material, and 4-dibenzylamino-2-methylbenzaldehyde-1,1-diphenylhydrazone was used as CT material.

Evaluation of Property of the Photoreceptors

Electrophotographic property of the photoconductors prepared in Examples 13 to 36 and Comparative Examples 1 to 5 were measured. A static electricity charging tester "EPA-8200" manufactured by Kawaguchi Denki K.K. was used as the measuring apparatus.

The sample was corona charged at −8.0 kV in STAT 3 mode by first. It was then left in the dark for 20 seconds, and irradiated by 5.0 lux white light for 10.0 seconds. The charged potential (Vo), the sensitivity half-value irradiation amount ($E_{1/2}$), the residual potential (Vr) were recorded. The results were shown in Tables 8 and 9.

TABLE 8

| Example No. | CG material Polymorph | Solvent[1] | CT material |
|---|---|---|---|
| 13 | Pseudo II | — | T-405 |
| 14 | Pseudo II | — | CTC-191 |
| 15 | II | cyclohexanone | T-405 |
| 16 | II | cyclohexanone | CTC-191 |
| 17 | II | dimethylformamide | T-405 |
| 18 | II | dimethylformamide | CTC-191 |
| 19 | II | amyl alcohol | T-405 |
| 20 | II | amyl alcohol | CTC-191 |
| 21 | II | tetrahydrofuran | T-405 |
| 22 | II | tetrahydrofuran | CTC-191 |
| 23 | II | trimethylene glycol | T-405 |
| 24 | II | trimethylene glycol | CTC-191 |
| 25 | II | o-xylene | T-405 |
| 26 | II | o-xylene | CTC-191 |
| 27 | II | diethylene glycol | T-405 |
| 28 | II | diethylene glycol | CTC-191 |
| 29 | II | ethanol | T-405 |
| 30 | II | ethanol | CTC-191 |
| 31 | II | diisopropyl ketone | T-405 |
| 32 | II | diisopropyl ketone | CTC-191 |
| 33 | III | ethylene glycol | T-405 |
| 34 | III | ethylene glycol | CTC-191 |

TABLE 8-continued

| Example No. | CG material Polymorph | Solvent[1] | CT material |
|---|---|---|---|
| 35 | IV | diglyme | T-405 |
| 36 | IV | diglyme | CTC-191 |
| Comp. 1 | titanyl Pc | — | CTC-191 |
| Comp. 2 | X-form H2-Pc[2] | — | T-405 |
| Comp. 3 | hydroxy-Al Pc[3] | — | CTC-191 |
| Comp. 4 | I | o-dichlorobenzene | T-405 |
| Comp. 5 | I | o-dichlorobenzene | CTC-191 |

[1]Solvent which is used for the development of the corresponding polymorph
[2]X-form nonmetallo-Pc
[3]hydroxyaluminum Pc
T-405: 1,1-bis(p-diethylaminophenyl)-4,4'-diphenyl-1,3-butadiene available from Takasa Koryo K. K.
CTC-191: 4-benzylamino-2-methylbenzaldehyde-1,1'-diphenylhydorazone manufactured by Takasa Koryo K. K.

TABLE 9

| Example No. | Vo (V) | $E_{1/2}$ (Lux · sec) | Vr (V) |
|---|---|---|---|
| 13 | −60.0 | 9.70 | −5.3 |
| 14 | −76.7 | 16.63 | −14.3 |
| 15 | −86.0 | 1.36 | −6.0 |
| 16 | −102.3 | 2.28 | −1.7 |
| 17 | −19.7 | 2.19 | −5.0 |
| 18 | −40.7 | 8.13 | −2.3 |
| 19 | −140.3 | 2.85 | −6.0 |
| 20 | −165.7 | 4.67 | −3.3 |
| 21 | −9.70 | — | −5.0 |
| 22 | −25.3 | 11.71 | −2.7 |
| 23 | −58.0 | 4.11 | −4.0 |
| 24 | −81.7 | 7.61 | −8.4 |
| 25 | −17.0 | 2.74 | −4.7 |
| 26 | −31.0 | 8.37 | −2.3 |
| 27 | −58.0 | 2.01 | −5.0 |
| 28 | −28.3 | 6.27 | −2.0 |
| 29 | −111.0 | 7.86 | −0.3 |
| 30 | −142.7 | 10.54 | −15.0 |
| 31 | −26.0 | 1.11 | −5.7 |
| 32 | −39.7 | 2.43 | 0.0 |
| 33 | — | — | — |
| 34 | −36.3 | 13.39 | −5.0 |
| 35 | −45.7 | 4.20 | −4.0 |
| 36 | −68.0 | 7.86 | −5.0 |
| Comp. 1 | −173.0 | 1.09 | −2.0 |
| Comp. 2 | −254.0 | 3.18 | −5.0 |
| Comp. 3 | −43.7 | 1.86 | −1.0 |
| Comp. 4 | −19.0 | 3.06 | −4.7 |
| Comp. 5 | −48.7 | 18.1 | −9.0 |

—: impossible to measure

The photoreceptors of the examples show excellent photoconductive property. Particularly, those which employ the II-form dimer polymorphied by amyl alcohol or cyclohexanone (Examples 15, 16, 19 and 20) show high photoconductivity in good reproductivity. On the other hand, the Comparative Examples which employ the conventional CG materials such as Y-form titanyl Pc and X-form nonmetallo-Pc, show poor photosensitive properties.

Thus, μ-oxo-aluminum Pc dimer having novel polymorph of the present invention has high performance fit for the practical use as a CG material. The inventors are now further investigating a binder and a CT material which well match with the present μ-oxo-aluminum Pc dimer.

In order to prove good reproductivity of the photoconductors which employ the II-form dimer, the photoconductors of Examples 15 and 19, and Comparative Example 1 and 2, were corona charged as described above and discharged, 100 times.

Figure 15:
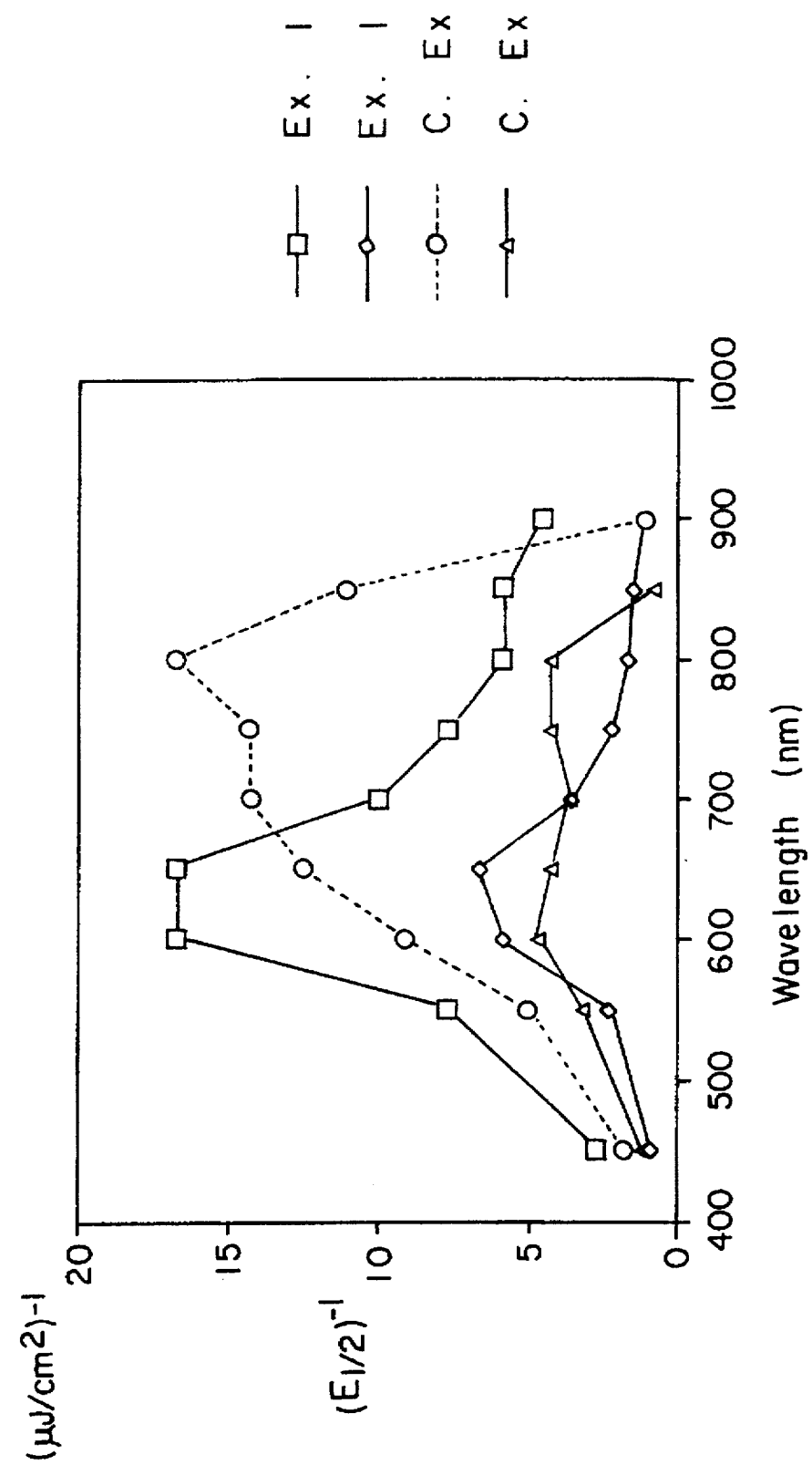
FIG. 15 is a plot of results obtained by a spectroscopic sensitivity analysis of photoreceptors prepared in Examples 15 and 19, and Comparative Examples 1 and 2.
Figure 16:
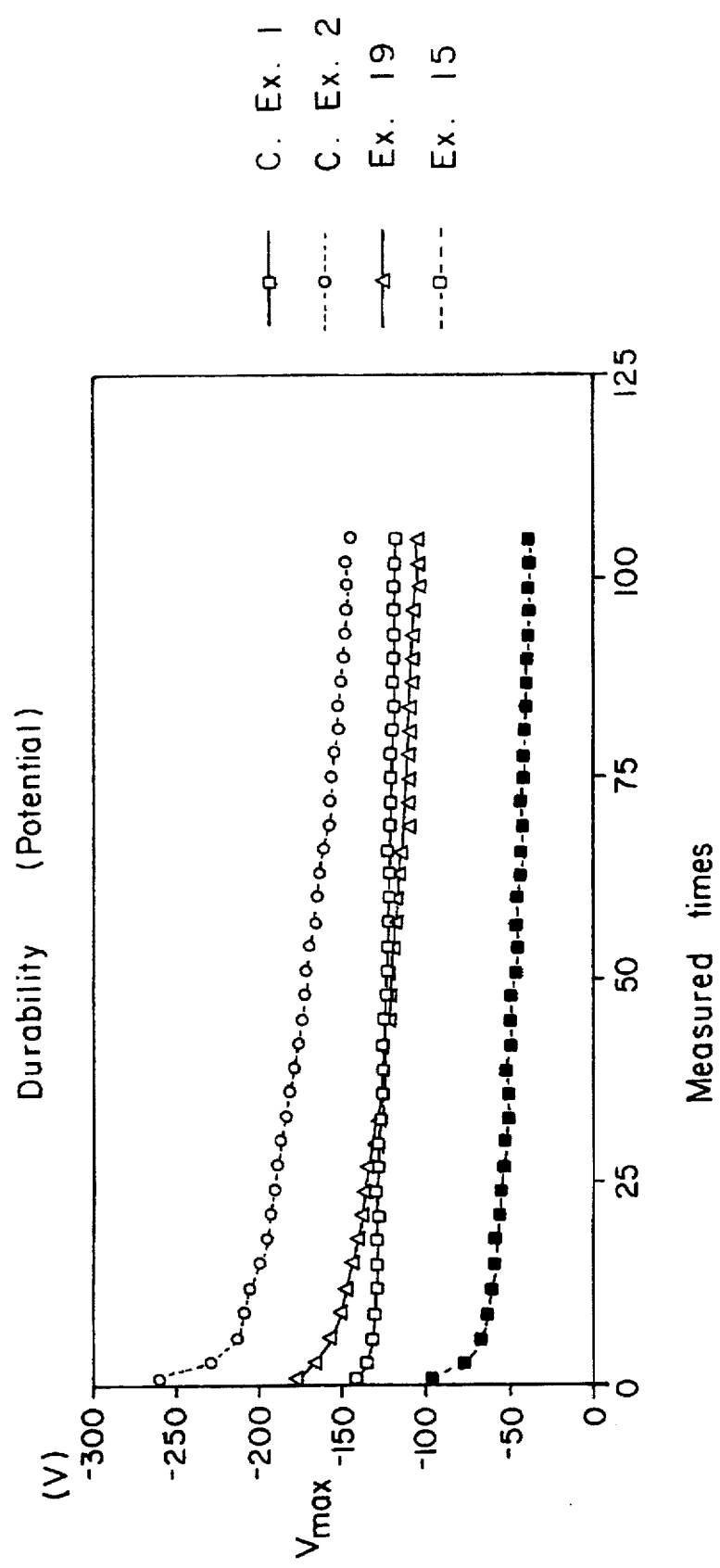
FIG. 16 is a plot of results obtained by a potential durability analysis of photoreceptors which is prepared in Examples 15 and 19, and Comparative Examples 1 and 2.

Spectroscopic sensitivities of the resulting photoconductors were shown in FIG. 15. Change of charged potential (Vo), and Residual potential (Vr) during the procedure of charging and discharging was shown in FIG. 16 and 17, respectively.

As a result, μ-oxo-aluminum Pc dimer having novel polymorph of the present invention is useful as a photoconductive materials for use in the related art of optoelectronics.

What is claimed is:

1. μ-Oxo-aluminum phthalocyanine dimer having a novel polymorph which shows diffraction peaks at a Bragg angle (2θ±0.2°) of 6.9°, 9.7°, 13.8°, 15.4°, 23.9°, and 25.9° in a X-ray diffraction spectrum by CuK α-ray.

2. μ-Oxo-aluminum phthalocyanine dimer having a novel polymorph which shows diffraction peaks at a Bragg angle (2θ±0.2°) of 6.9°, 14.0°, 15.7°, and 25.7° in a X-ray diffraction spectrum by CuK α-ray.

3. μ-Oxo-aluminum phthalocyanine dimer having a novel polymorph which shows diffraction peaks at a Bragg angle (2θ±0.2°) of 6.9°, 13.0°, 14.8°, 16.1°, 21.1°, 25.1°, and 25.8° in a X-ray diffraction spectrum by CuK α-ray.

4. A process for producing μ-oxo-aluminum phthalocyanine dimer having a novel polymorph comprising:

obtaining μ-oxo-aluminum phthalocyanine dimer;

dry milling the μ-oxo-aluminum phthalocyanine dimer; and wet milling or simply dispersing the dry milled μ-oxo-aluminum phthalocyanine dimer in an organic solvent.

5. The process according to claim 4, wherein the wet milling or simply dispersing is conducted by using the organic solvent selected from the group consisting of cyclohexanone, diisopropyl ketone, amyl alcohol, ethanol, diethylene glycol, trimethylene glycol, DMF, and THF.

6. The process according to claim 4, wherein the wet milling or simply dispersing is conducted by using the organic solvent selected from the group consisting of cyclohexanone, and amyl alcohol.

7. The process according to claim 4, wherein the wet milling or simply dispersing is conducted by using ethylene glycol.

8. The process according to claim 4, wherein the wet milling or simply dispersing is conducted by using the organic solvent selected from the group consisting of monoglyme, diglyme, triglyme, and tetraglyme.

9. μ-Oxo-aluminum phthalocyanine dimer having a novel polymorph which shows diffraction peaks at a Bragg angle (2θ±0.2°) of 6.8°, 15.4°, and 24.0° in a X-ray diffraction spectrum by CuK α-ray.

10. A process for producing μ-oxo-aluminum phthalocyanine dimer having a novel polymorph specified in claim 9, comprising:

obtaining μ-oxo-aluminum phthalocyanine dimer; and dry milling the μ-oxo-aluminum phthalocyanine dimer.

11. An electrophotographic photoreceptor which has a conductive substrate, and a photoconductive layer on the conductive substrate, wherein the photoconductive layer includes any one dimer of claims 1 to 3 or 9 as a charge generator.

12. A function separated-form electrophotographic photoreceptor which has a conductive substrate, a charge generating layer on the conductive substrate, and a charge transporting layer on the charge generating layer, wherein the charge generating layer includes any one dimer of claims 1 to 3 or 9 as a charge generator.

* * * * *

UNITED STATES PATENT AND TRADEMARK OFFICE
CERTIFICATE OF CORRECTION

PATENT NO. : 5,725,984
DATED : March 10, 1998
INVENTOR(S) : Yasuhiro Yamasaki, et. al.

It is certified that error appears in the above-identified patent and that said Letters Patent is hereby corrected as shown below:

Title page, item [54] and col. 1, change the title to read

--MU-OXO-ALUMINUM PHTHALOCYANINE DIMER HAVING NOVEL POLYMORPH AND ELECTROPHOTOGRAPHIC PHOTORECEPTOR PREPARED BY USING THE SAME--

Signed and Sealed this

Twentieth Day of October, 1998

Attest:

BRUCE LEHMAN

Attesting Officer

Commissioner of Patents and Trademarks